US012124190B2

(12) United States Patent
Fukui et al.

(10) Patent No.: US 12,124,190 B2
(45) Date of Patent: Oct. 22, 2024

(54) TONER CONTAINER INCLUDING GUIDING PORTION WITH A GUIDING SURFACE

(71) Applicant: CANON KABUSHIKI KAISHA, Tokyo (JP)

(72) Inventors: Yuichi Fukui, Kanagawa (JP); Goshi Ozaki, Kanagawa (JP); Mitsuhiro Sato, Tokyo (JP); Tetsushi Uneme, Kanagawa (JP); Hiroyuki Munetsugu, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 18/076,576

(22) Filed: Dec. 7, 2022

(65) Prior Publication Data

US 2023/0176503 A1 Jun. 8, 2023

(30) Foreign Application Priority Data

Dec. 7, 2021 (JP) ................................ 2021-198917

(51) Int. Cl.
*G03G 15/08* (2006.01)

(52) U.S. Cl.
CPC ..... *G03G 15/0881* (2013.01); *G03G 15/0874* (2013.01); *G03G 15/0886* (2013.01); *G03G 15/0872* (2013.01); *G03G 2215/0678* (2013.01); *G03G 2215/0682* (2013.01); *G03G 2215/0692* (2013.01)

(58) Field of Classification Search
CPC ........... G03G 15/0874; G03G 15/0886; G03G 15/0881; G03G 2215/0692; G03G 2215/0678; G03G 2215/0682
USPC ........................................................ 399/262
See application file for complete search history.

(56) References Cited

U.S. PATENT DOCUMENTS

| | | | |
|---|---|---|---|
| 7,149,457 | B2 | 12/2006 | Miyabe |
| 7,155,140 | B2 | 12/2006 | Arimitsu |
| 7,155,141 | B2 | 12/2006 | Sato |
| 7,158,736 | B2 | 1/2007 | Sato |
| 7,200,349 | B2 | 4/2007 | Sato |
| 7,218,882 | B2 | 5/2007 | Toba |
| 7,224,925 | B2 | 5/2007 | Sato |

(Continued)

FOREIGN PATENT DOCUMENTS

| | | | |
|---|---|---|---|
| JP | 2012-189920 | A | 10/2012 |
| JP | 2017-203870 | A | 11/2017 |

(Continued)

*Primary Examiner* — Robert B Beatty
(74) *Attorney, Agent, or Firm* — Venable LLP

(57) ABSTRACT

A toner container includes a toner accommodating portion, a discharge portion, a shutter, a sealing member, and a guiding portion. In a case where a direction from the toner accommodating portion toward the discharge portion in a rotational axis direction is a first direction, where a direction opposite to the first direction is a second direction, and where an end portion of the sealing member on a downstream side of the first direction is a first end portion, a downstream end portion of the guiding portion is positioned downstream of the first end portion of the sealing member with respect to the first direction. The downstream end portion of the guiding portion overlaps with the sealing member as viewed in the rotational axis direction, and includes an inclined surface inclined so as to approach the contact surface of the seal member as it goes in the second direction.

15 Claims, 27 Drawing Sheets

(56) References Cited

U.S. PATENT DOCUMENTS

| | | | | |
|---|---|---|---|---|
| 7,283,766 | B2 | 10/2007 | Arimitsu | |
| 7,349,657 | B2 | 3/2008 | Sato | |
| 7,412,193 | B2 | 8/2008 | Sato | |
| 8,160,478 | B2 | 4/2012 | Munetsugu | |
| 8,165,493 | B2 | 4/2012 | Chadani | |
| 8,275,283 | B2 | 9/2012 | Uneme | |
| 8,401,441 | B2 | 3/2013 | Uneme | |
| 8,483,589 | B2 | 7/2013 | Uneme | |
| 8,559,849 | B2 | 10/2013 | Suzuki | |
| 8,879,944 | B2 | 11/2014 | Takarada | |
| 8,879,954 | B2 | 11/2014 | Nonaka | |
| 8,909,096 | B2 | 12/2014 | Fukui | |
| 8,983,335 | B2 | 3/2015 | Yamashita | |
| 9,052,640 | B2 | 6/2015 | Kashiide | |
| 9,164,419 | B2 | 10/2015 | Uneme | |
| 9,188,940 | B2 | 11/2015 | Fukui | |
| 9,213,306 | B2 | 12/2015 | Morioka | |
| 9,274,489 | B2 | 3/2016 | Takarada | |
| 9,291,994 | B2 | 3/2016 | Kanno | |
| 9,304,488 | B2 | 4/2016 | Toba | |
| 9,367,025 | B2 | 6/2016 | Takarada | |
| 9,377,714 | B2 | 6/2016 | Nakazawa | |
| 9,501,031 | B2 | 11/2016 | Hayashi | |
| 9,541,863 | B2 | 1/2017 | Kashiide | |
| 9,594,330 | B1 * | 3/2017 | Shinozaki | G03G 15/0881 |
| 9,688,008 | B2 | 6/2017 | Takarada | |
| 9,720,374 | B2 | 8/2017 | Kanno | |
| 9,727,021 | B2 | 8/2017 | Fukui | |
| 9,733,612 | B2 | 8/2017 | Toba | |
| 10,254,712 | B2 | 4/2019 | Uneme | |
| 10,386,786 | B2 | 8/2019 | Sato | |
| 10,444,702 | B2 | 10/2019 | Sato | |
| 10,459,402 | B2 | 10/2019 | Kashiide | |
| 10,635,047 | B2 | 4/2020 | Kamoshida | |
| 10,678,185 | B2 | 6/2020 | Uneme | |
| 10,705,481 | B2 | 7/2020 | Sugimoto | |
| 10,782,647 | B2 | 9/2020 | Kashiide | |
| 10,877,434 | B2 | 12/2020 | Sato | |
| 11,036,181 | B2 | 6/2021 | Uneme | |
| 11,067,950 | B2 | 7/2021 | Kashiide | |
| 11,099,521 | B2 | 8/2021 | Uneme | |
| 11,131,960 | B2 | 9/2021 | Sato | |
| 11,307,529 | B2 | 4/2022 | Sato | |
| 11,307,531 | B2 | 4/2022 | Uneme | |
| 11,314,199 | B2 | 4/2022 | Sato | |
| 11,353,822 | B2 | 6/2022 | Kashiide | |
| 11,392,082 | B2 | 7/2022 | Nishida | |
| 11,567,445 | B2 | 1/2023 | Munetsugu | |
| 11,592,766 | B2 | 2/2023 | Ozaki | |
| 2012/0125944 | A1 * | 5/2012 | Okuma | G03G 15/0877 220/810 |
| 2013/0164041 | A1 * | 6/2013 | Koyama | G03G 15/0877 399/260 |
| 2017/0269506 | A1 * | 9/2017 | Morita | G03G 15/0898 |
| 2018/0052407 | A1 * | 2/2018 | Eto | G03G 15/0886 |
| 2019/0212674 | A1 | 7/2019 | Murakami et al. | |
| 2020/0301352 | A1 | 9/2020 | Matsumaru | |
| 2021/0263467 | A1 | 8/2021 | Sato | |
| 2021/0364948 | A1 * | 11/2021 | Munetsugu | G03G 15/0886 |
| 2021/0397122 | A1 | 12/2021 | Fukui | |
| 2022/0050417 | A1 | 2/2022 | Nishida | |
| 2022/0075312 | A1 | 3/2022 | Ozaki | |
| 2022/0155722 | A1 | 5/2022 | Kashiide | |
| 2022/0197211 | A1 | 6/2022 | Sato | |
| 2022/0221820 | A1 | 7/2022 | Ozaki | |
| 2022/0413414 | A1 | 12/2022 | Ozaki | |
| 2023/0031856 | A1 | 2/2023 | Munetsugu | |
| 2023/0048100 | A1 | 2/2023 | Matsumaru | |

FOREIGN PATENT DOCUMENTS

| | | | |
|---|---|---|---|
| JP | 2019-056847 | A | 4/2019 |
| JP | 2021-124694 | A | 8/2021 |

* cited by examiner (a)

(b)

(a)

(b)

(a)

(b)

(c)

(a)

(b)

(c) (b) (a)

TONER CONTAINER INCLUDING GUIDING PORTION WITH A GUIDING SURFACE

FIELD OF THE INVENTION AND RELATED ART

The present invention relates to a toner container and an image forming system, in which an image is formed on a recording material.

In general, an image forming apparatus of an electrophotographic type forms an image by transferring a toner image, formed on a surface of a photosensitive drum, onto a transfer material as a transfer medium. Further, as a developer supplying type, for example, a process cartridge type or a toner supplying (replenishing) type has been known. The process cartridge type is a type in which the photosensitive drum and a developing (developer), container are integrally assembled as a process cartridge in which the process cartridge is exchanged with a new one when the developer (toner) runs out.

On the other hand, the toner supplying type is a type in which when the toner runs out, toner is newly supplied (replenished) to a developing container. In recent years, as an image forming apparatus of such a toner supplying type, an image forming apparatus using a toner pack mountable on a mounting portion is disclosed (Japanese Laid-Open Patent Application (JP-A) 2021-124694).

In the case where the toner is supplied by dismounting and mounting the toner container such as the toner pack, during the toner supply, it has been required that leakage of the toner is minimized.

SUMMARY OF THE INVENTION

According to an aspect of the present invention, there is provided a toner container comprising: a toner accommodating portion configured to accommodate toner; a discharge portion provided with a discharge opening through which the toner accommodated in the accommodating portion may be discharged; a shutter rotatable about a rotational axis between an open position where the discharge opening is open and a closed position where the discharge opening is closed, the discharge opening being disposed in an outer peripheral surface of the discharge portion extending in a direction of the rotational axis; a sealing member provided on an inner peripheral surface of the shutter directed inward in a radial direction of a virtual circle centered on the rotational axis, wherein the seal member is configured to seal between the inner peripheral surface of the shutter and the outer peripheral surface of the discharge portion when the shutter is in the closed position, the sealing member including a contact surface contacting the outer peripheral surface of the discharge portion; and a guiding portion including a downstream end portion, wherein in a case where a direction from the toner accommodating portion toward the discharge portion in the direction of the rotational axis is a first direction, where a direction opposite to the first direction is a second direction, and where an end portion of the sealing member on a downstream side of the first direction is a first end portion, the downstream end portion of the guiding portion is positioned downstream of the first end portion of the sealing member with respect to the first direction, wherein the downstream end portion of the guiding portion overlaps with the sealing member as viewed in the direction of the rotational axis, and includes an inclined surface inclined so as to approach the contact surface of the seal member as it goes in the second direction.

Further features of the present invention will become apparent from the following description of exemplary embodiments with reference to the attached drawings.

BRIEF DESCRIPTION OF THE DRAWINGS

Part (a) of FIG. 1 is sectional view showing an image forming apparatus according to a first embodiment, and part (b) of FIG. 1 is a perspective view showing the image forming apparatus.

Figure 4:
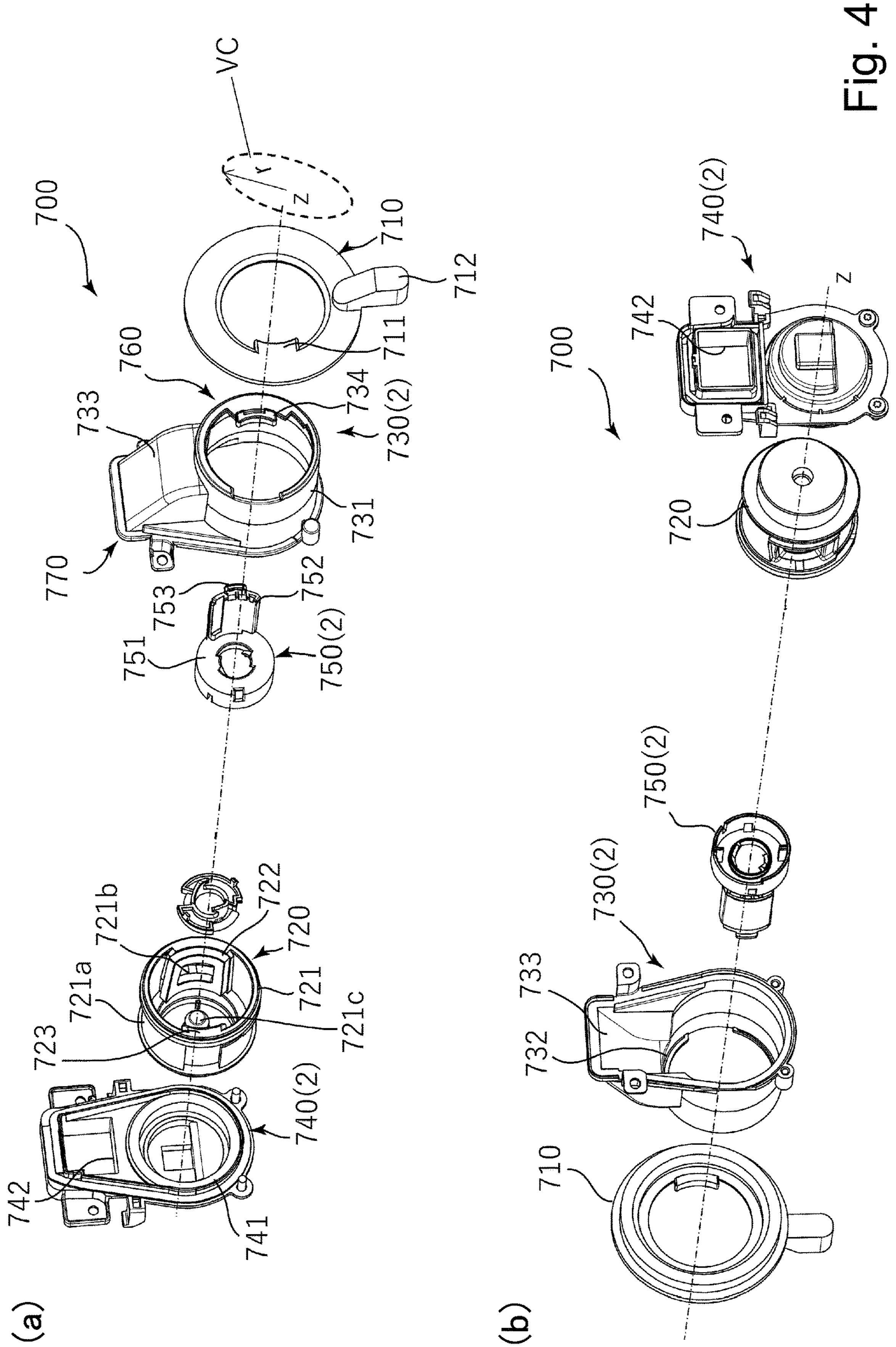

Parts (a) and (b) of FIG. 4 is exploded perspective views showing a mounting portion.

Figure 5:
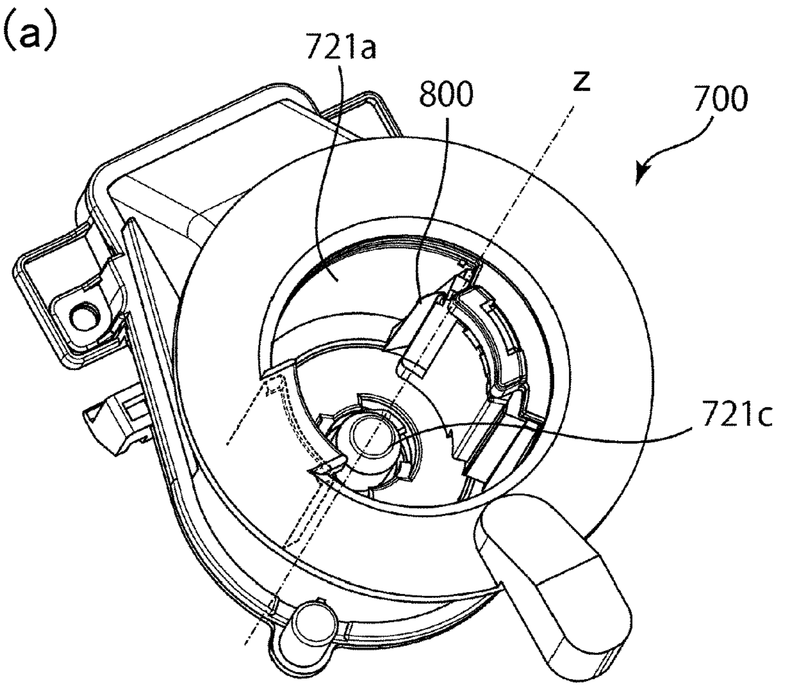
Figure 5:
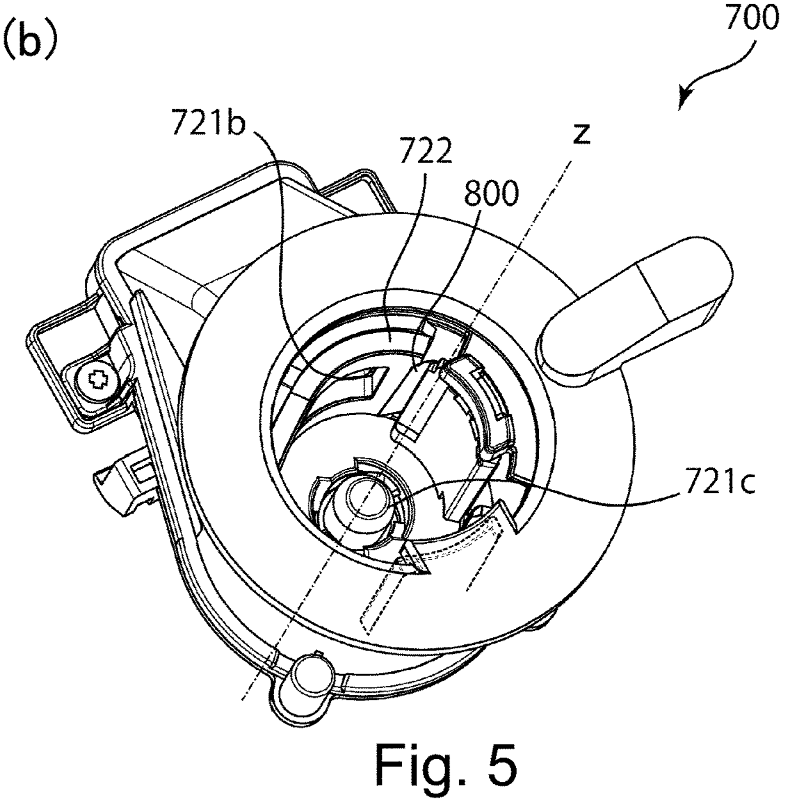

Parts (a) and (b) of FIG. 5 is perspective views showing the mounting portion.

Figure 6:
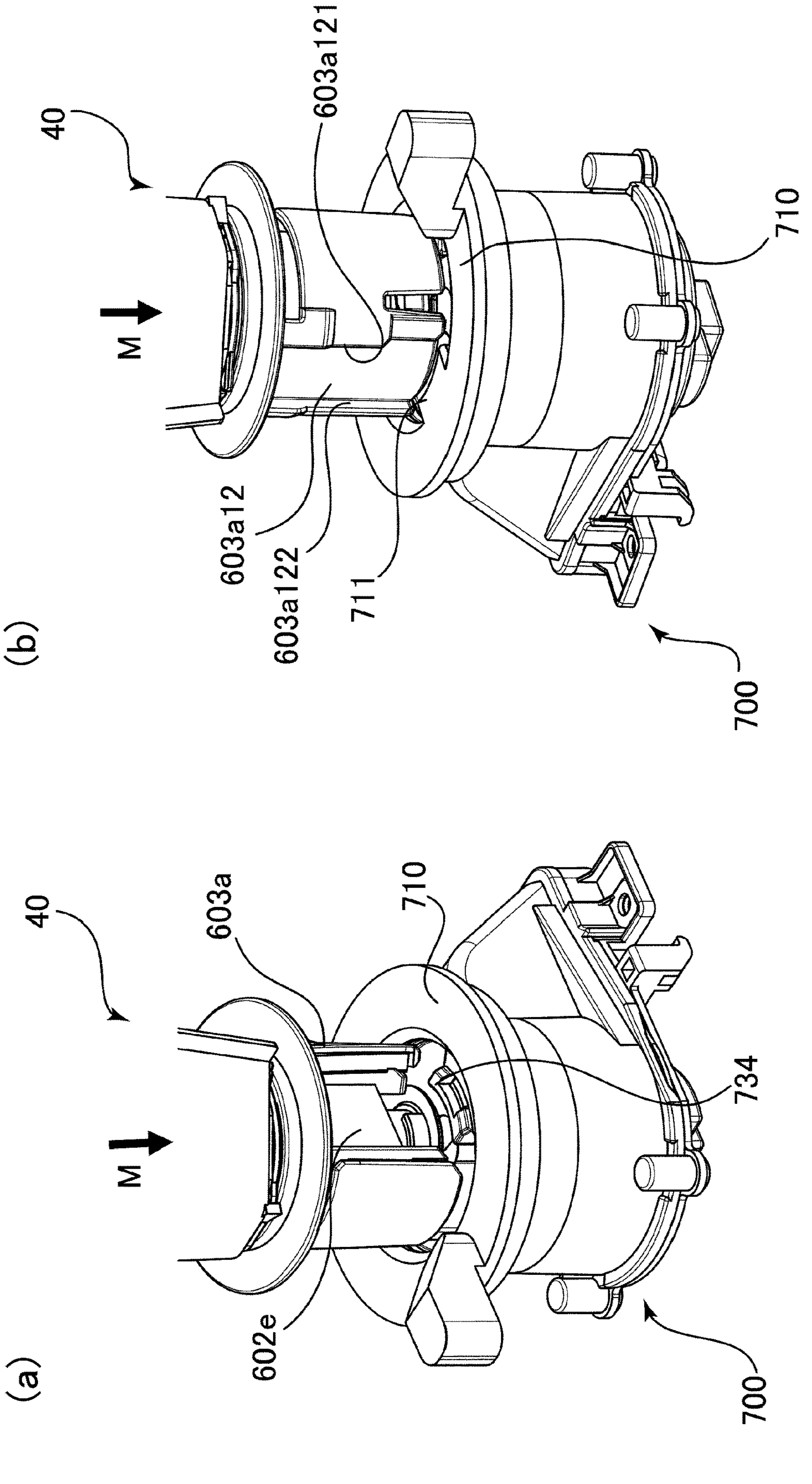

Parts (a) and (b) of FIG. 6 are perspective views for illustrating a mounting operation of the toner pack onto the mounting portion.

Figure 7:
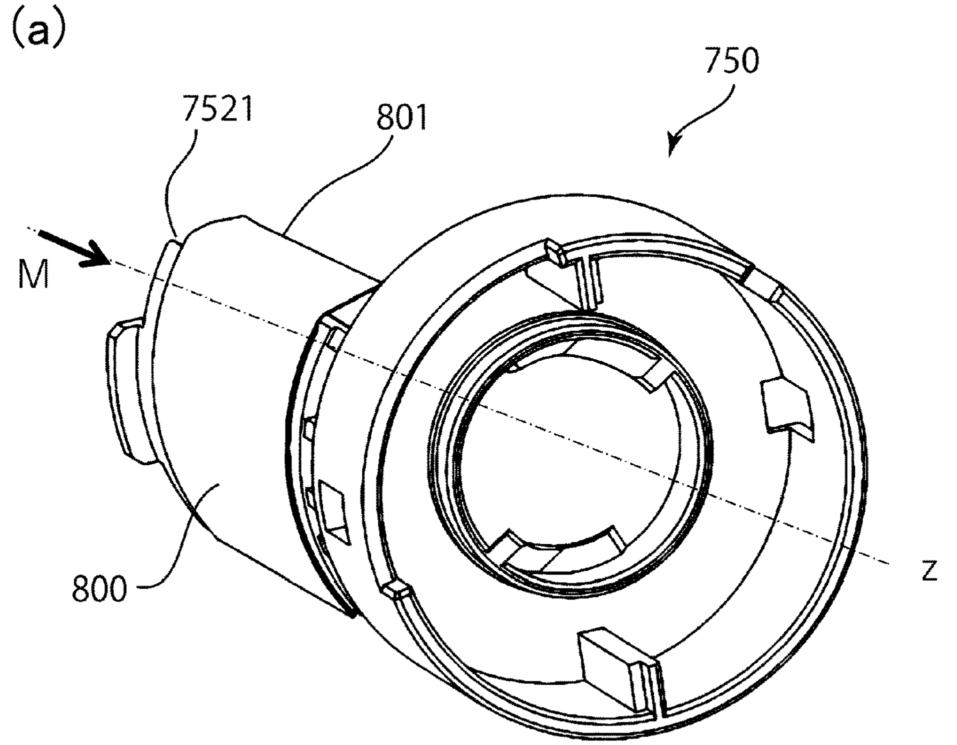
Figure 7:
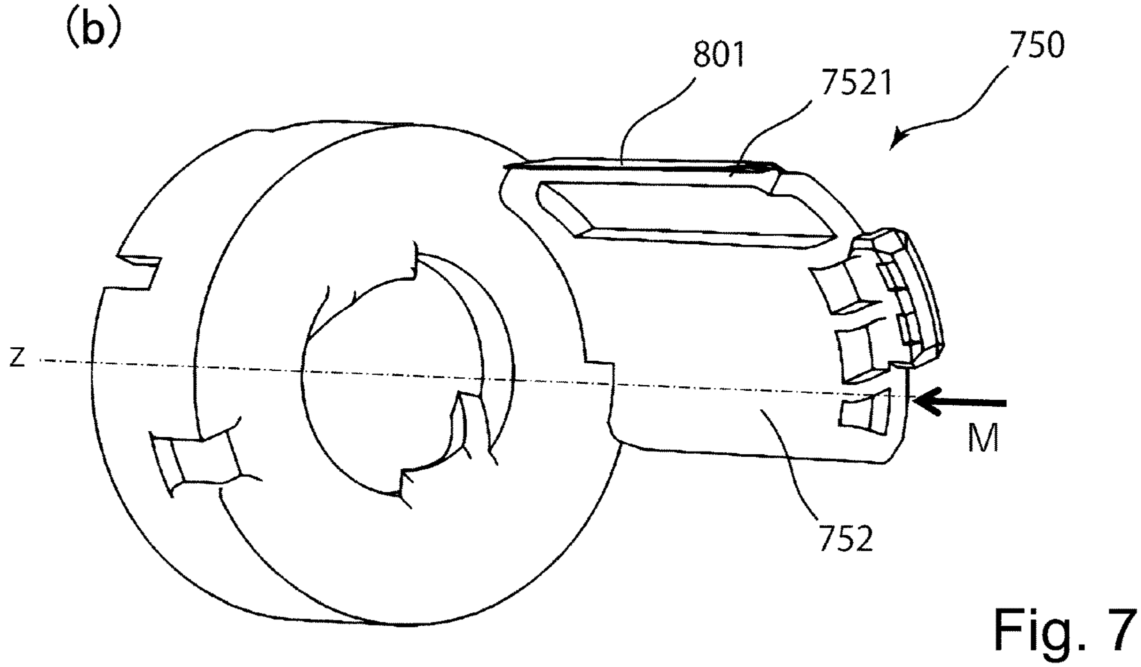

Parts (a) and (b) of FIG. 7 are perspective views showing a cover.

Figure 8:
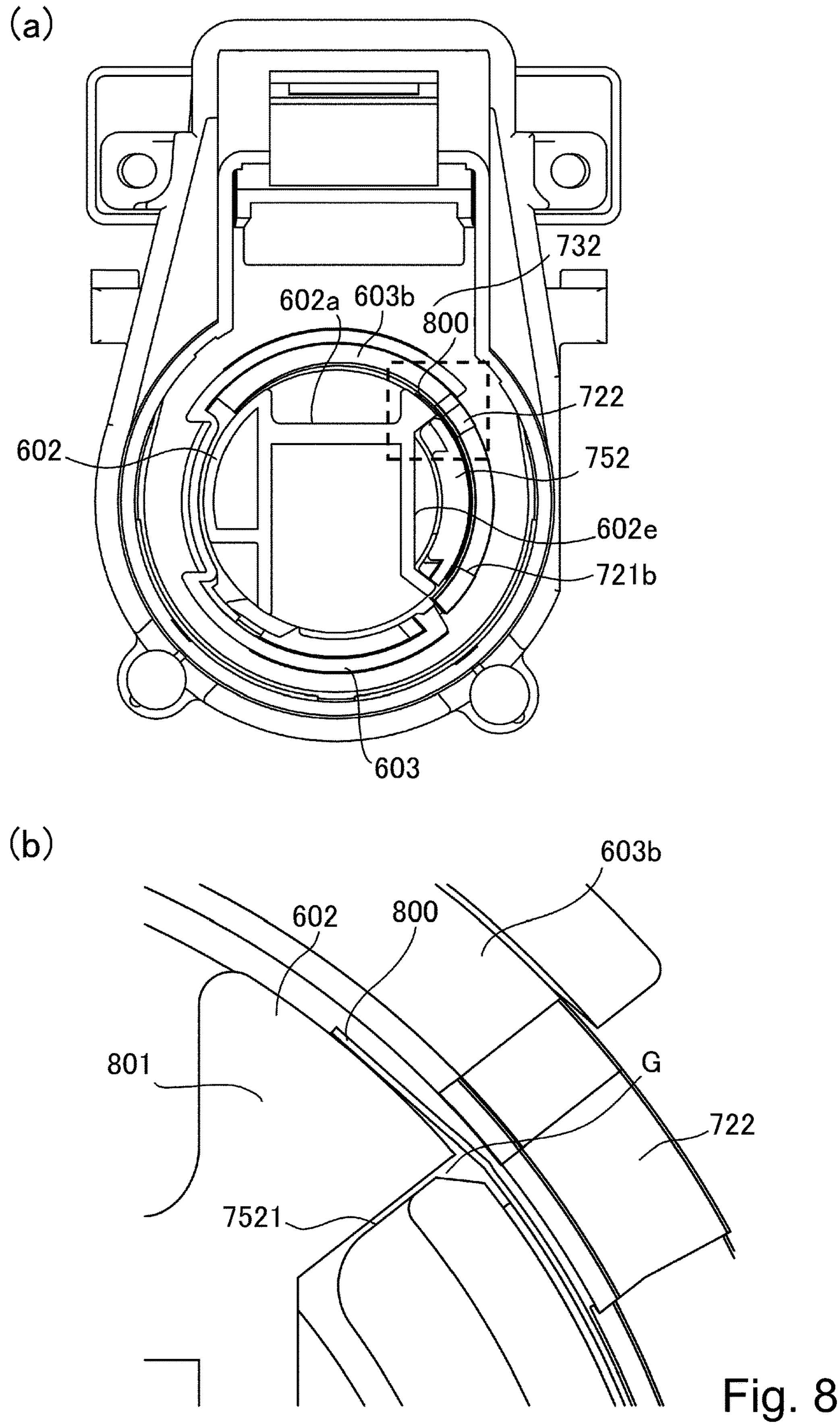

Parts (a) and (b) of FIG. 8 are sectional views showing the mounting portion in a state in which the toner pack is mounted and showing a state in which a shutter is in a shielding position.

Figure 9:
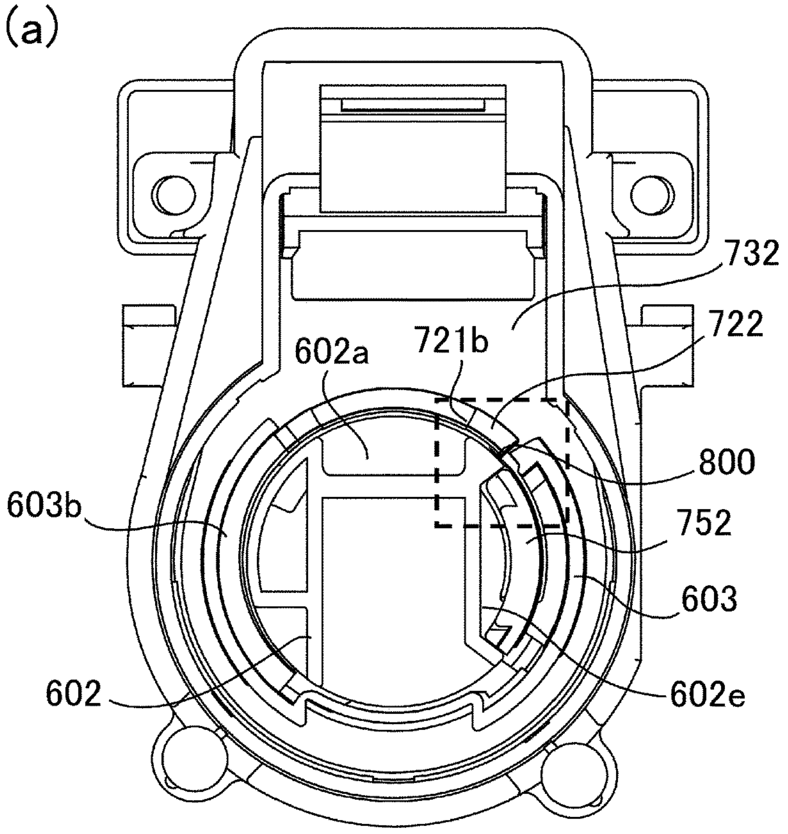
Figure 9:
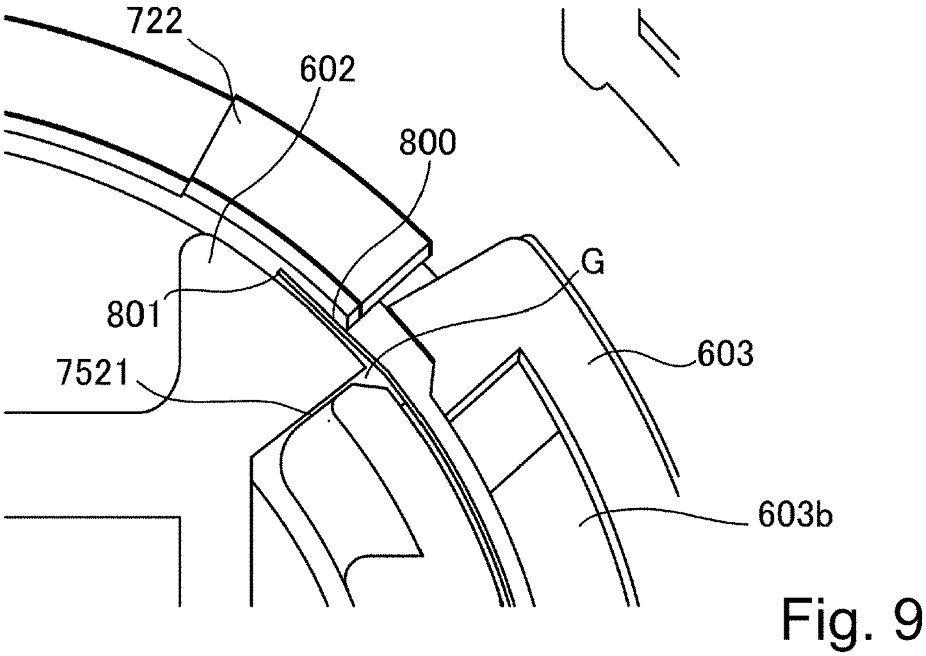

Parts (a) and (b) of FIG. 9 are sectional views showing the mounting portion in the state in which the toner pack is mounted and showing a state in which the shutter is in an open position.

Figure 10:
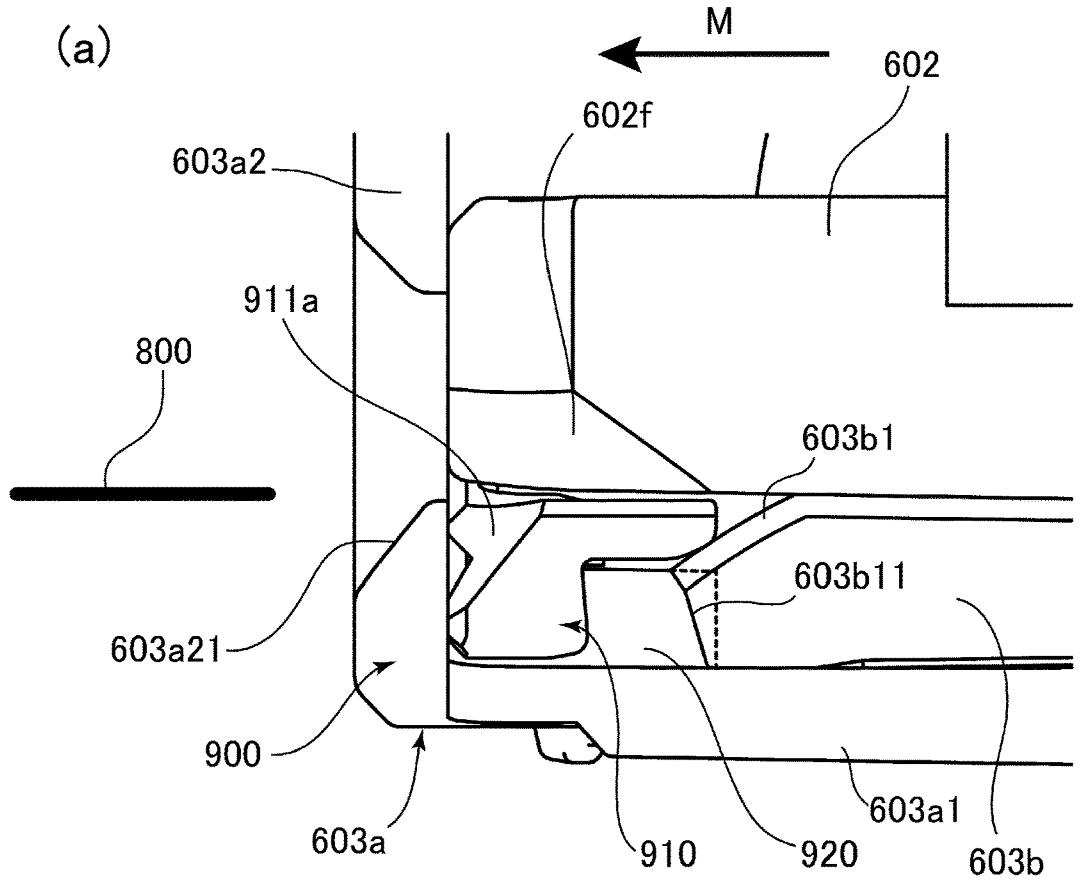
Figure 10:
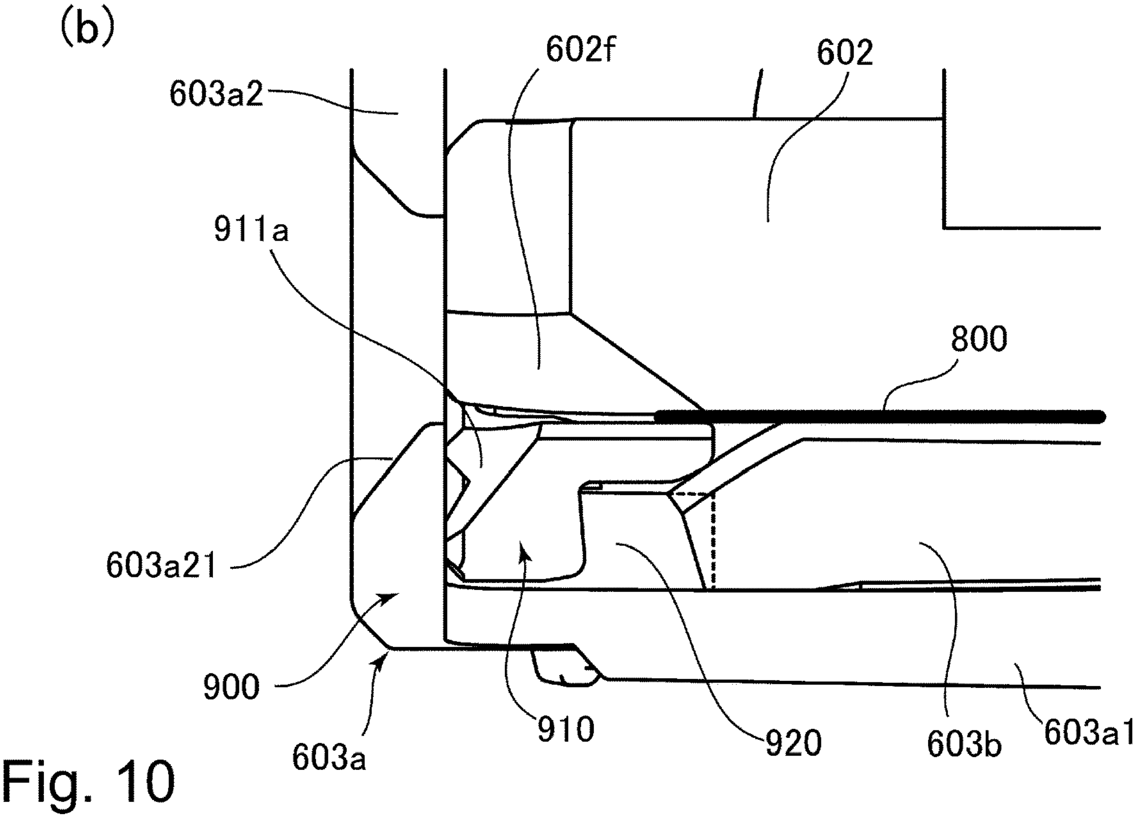

Parts (a) and (b) of FIG. 10 are schematic views for illustrating an operation when a mask sheet is inserted.

Figure 11:
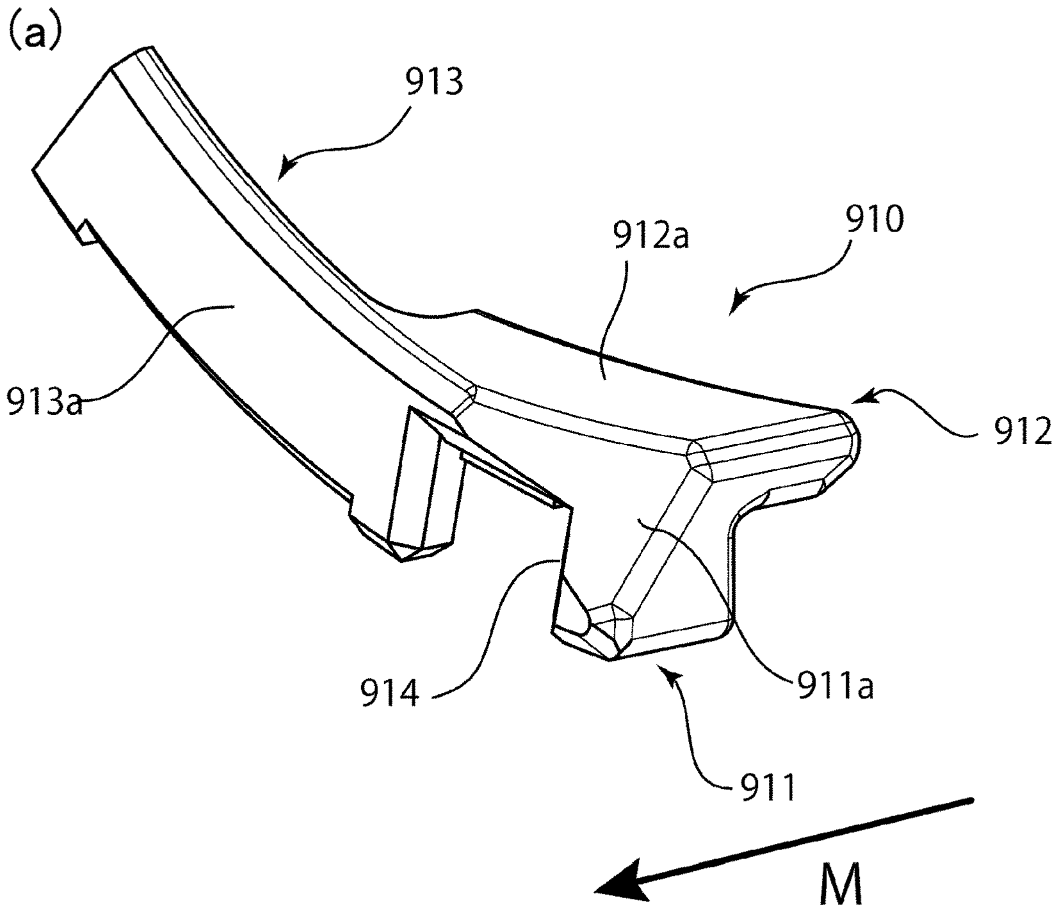
Figure 11:
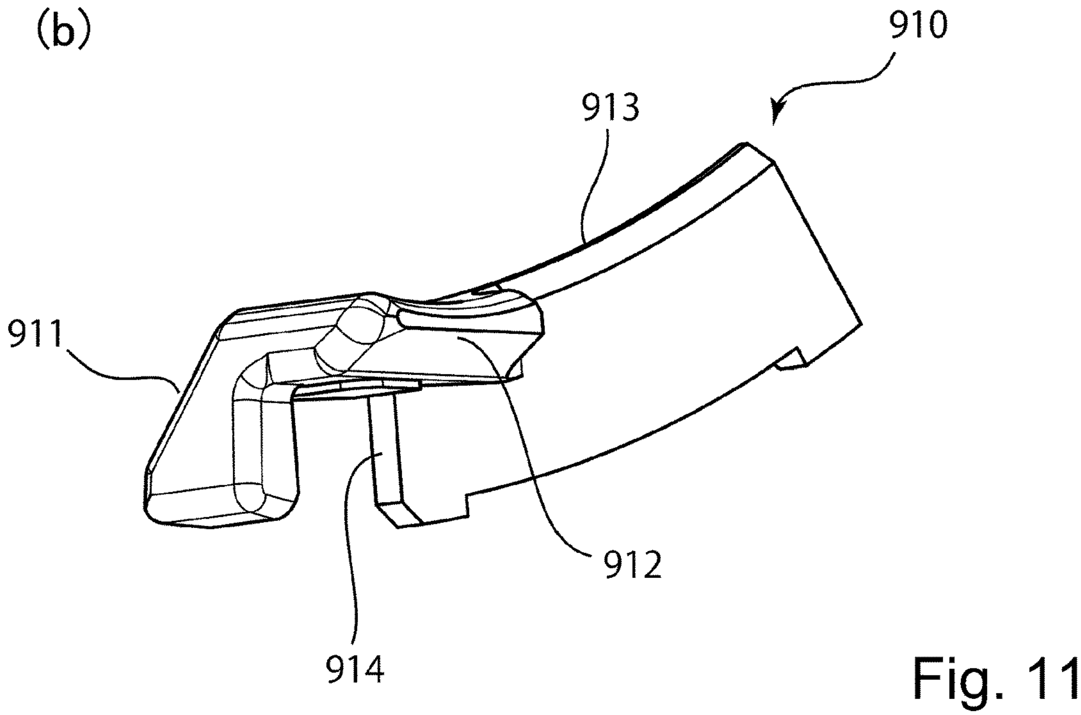

Parts (a) and (b) of FIG. 11 are perspective views showing a guide piece.

Figure 12:
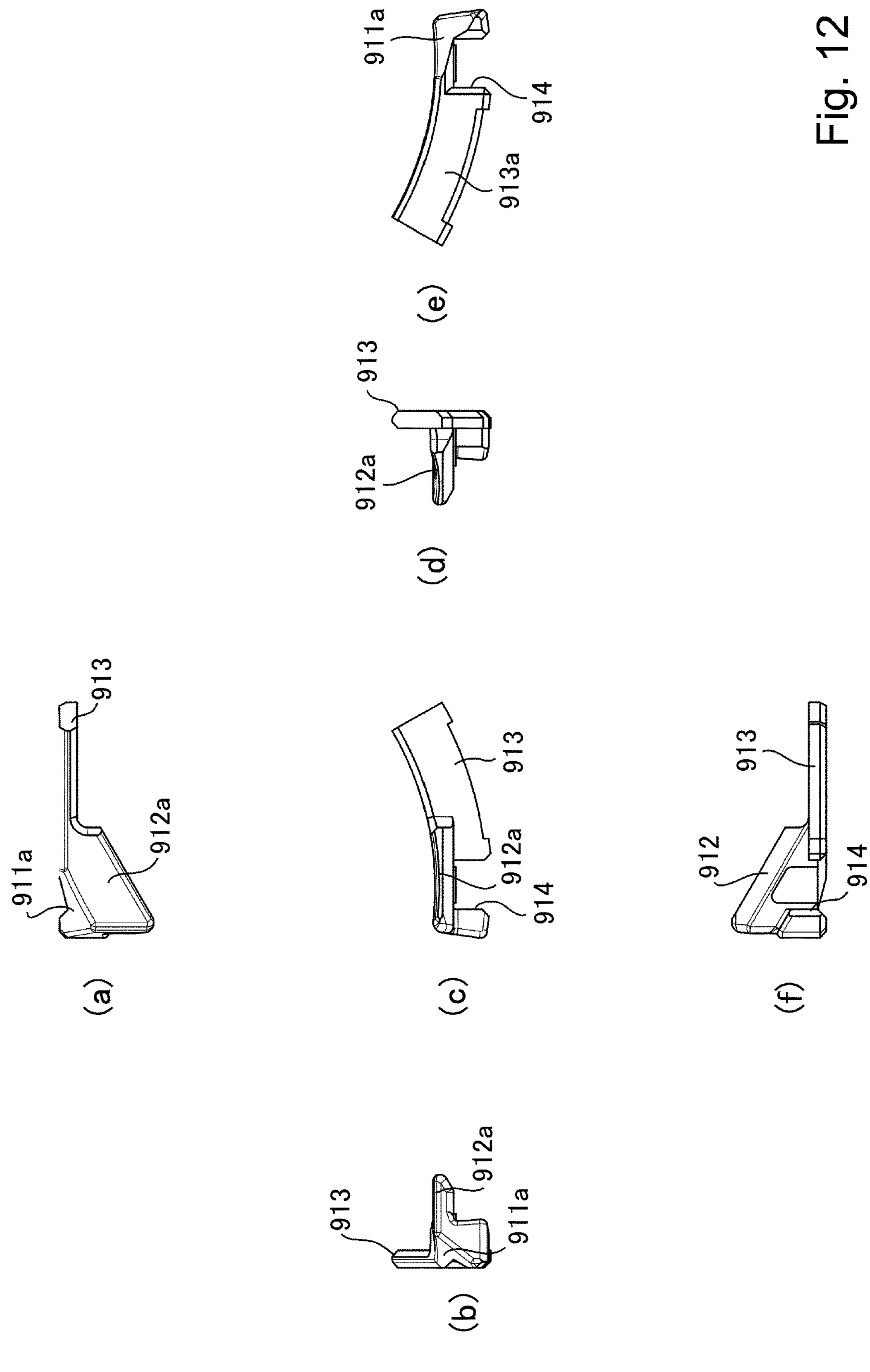

Parts (a) to (f) of FIG. 12 are schematic views showing six sides of the guide piece.

Figure 13:
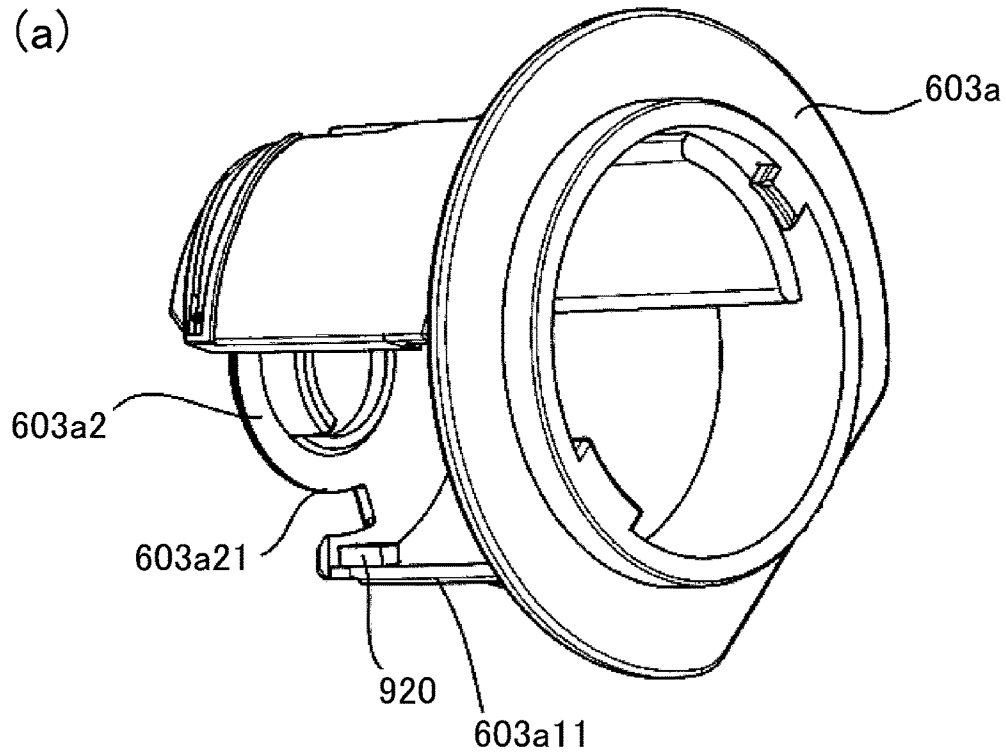
Figure 13:
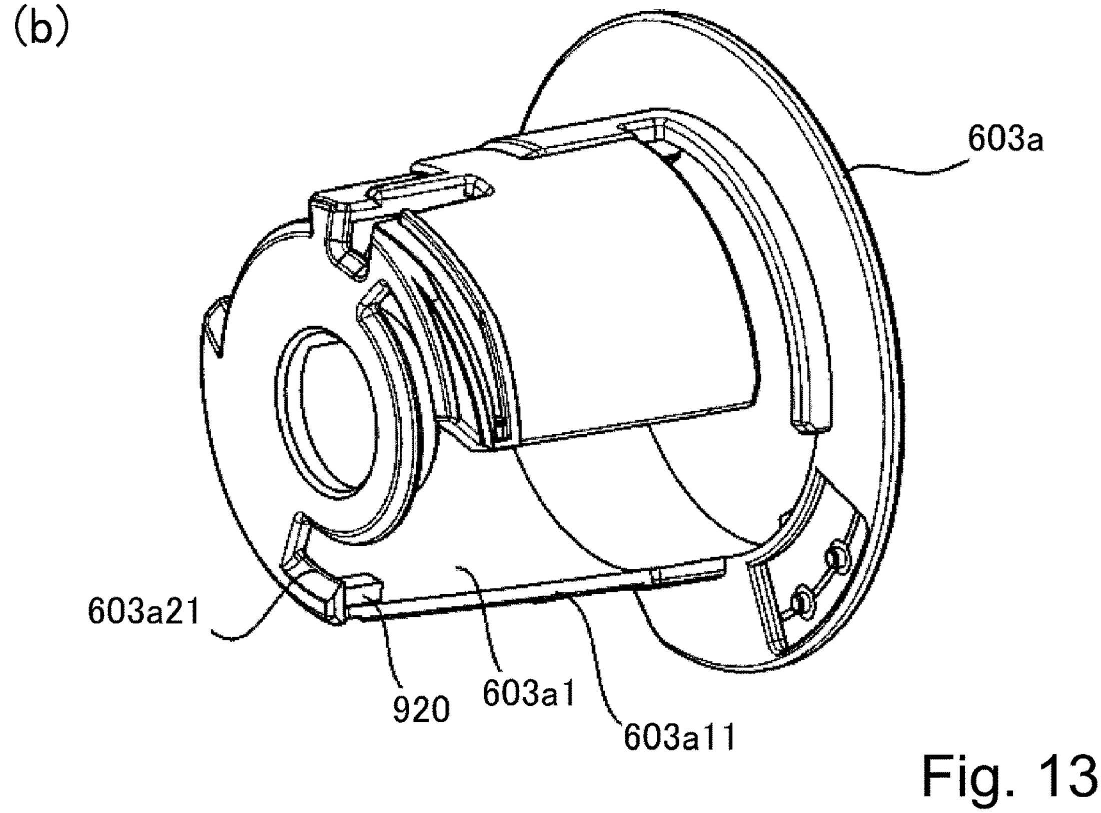

Parts (a) and (b) of FIG. 13 are perspective views showing a pass-side shutter main body.

Figure 14:
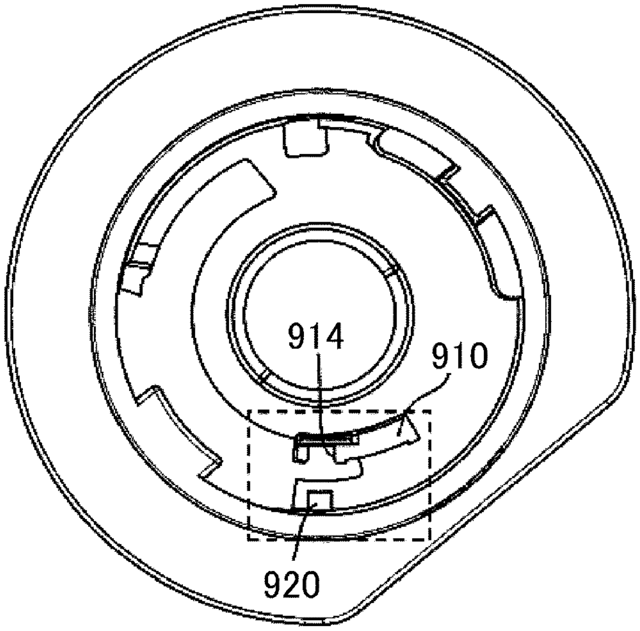
Figure 14:
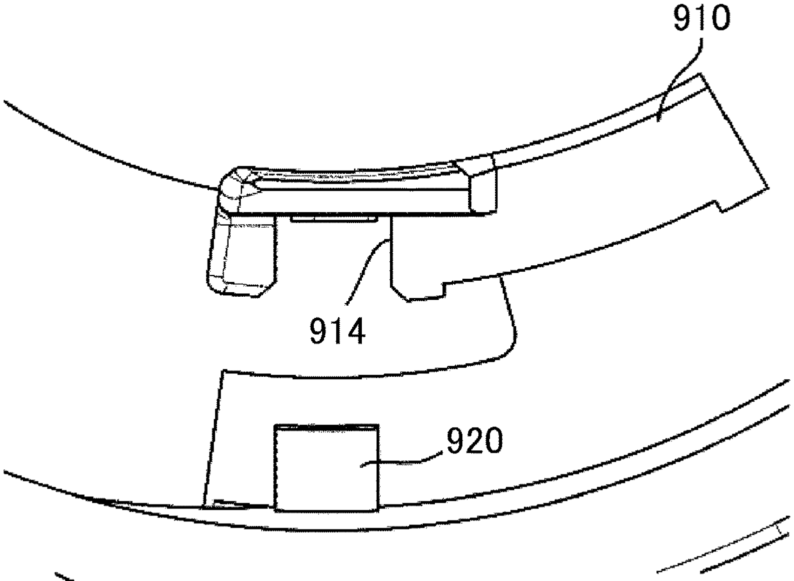
Figure 14:
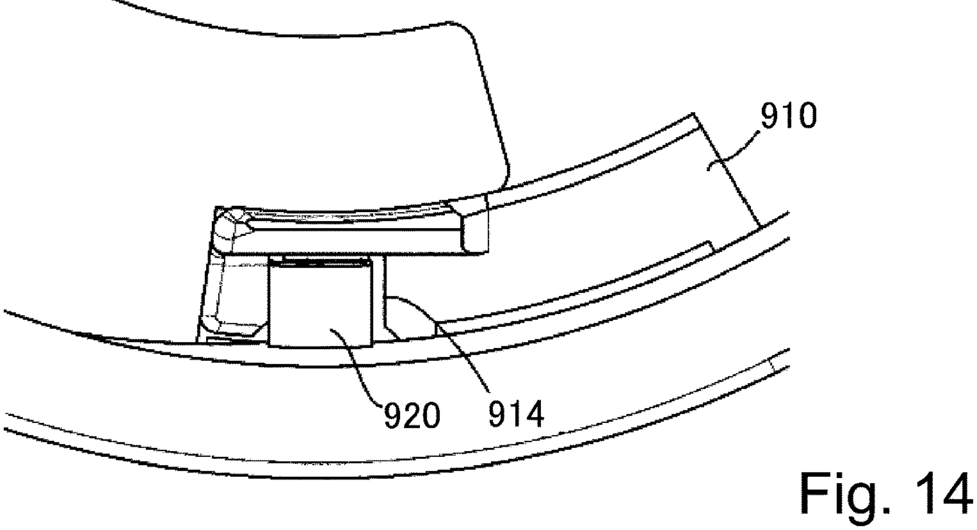

Parts (a) to (c) of FIG. 14 are schematic views showing mounting of the guide piece on a rib.

Figure 15:
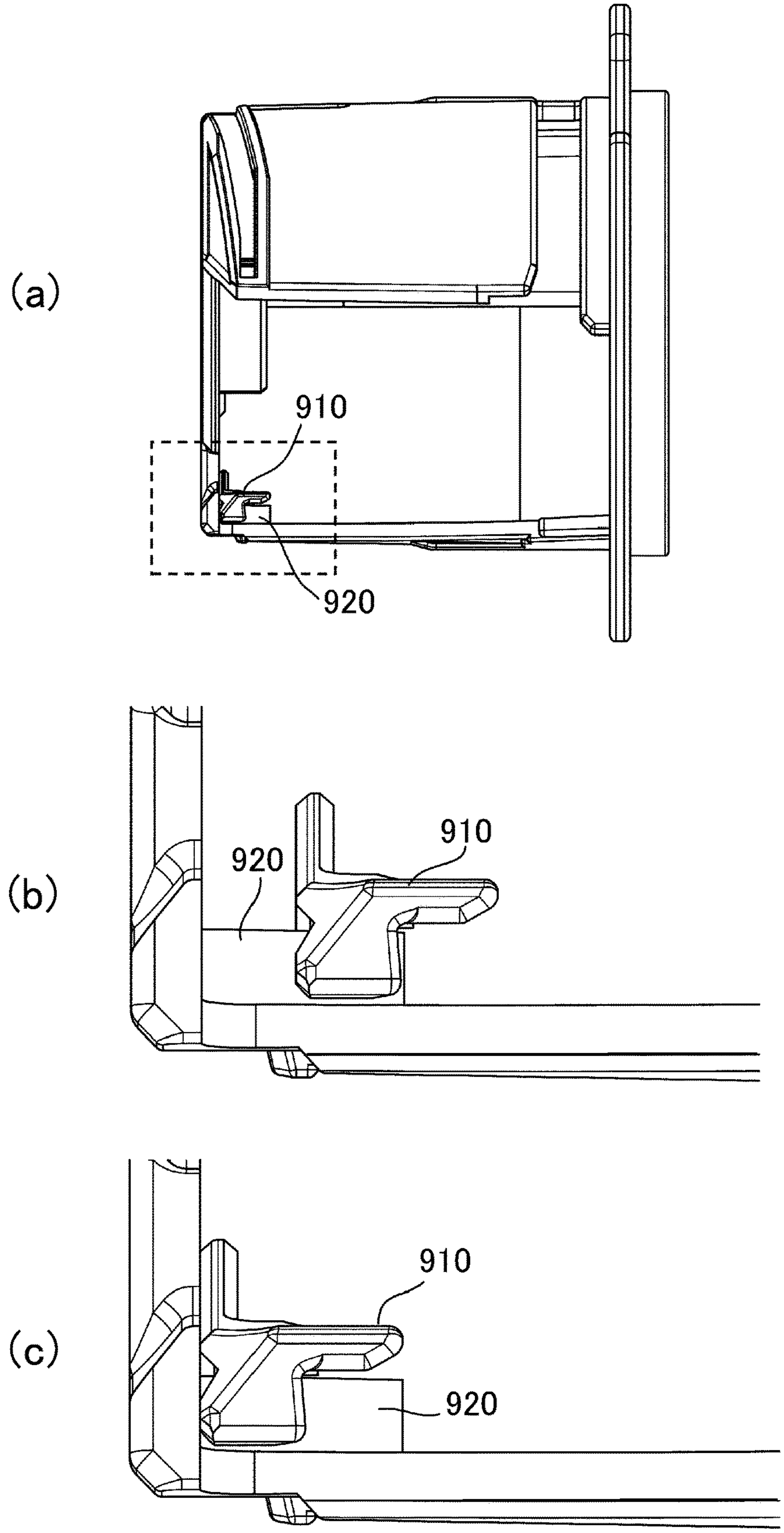

Parts (a) to (c) of FIG. 15 are schematic views showing the mounting of the guide piece on the rib.

Figure 16:
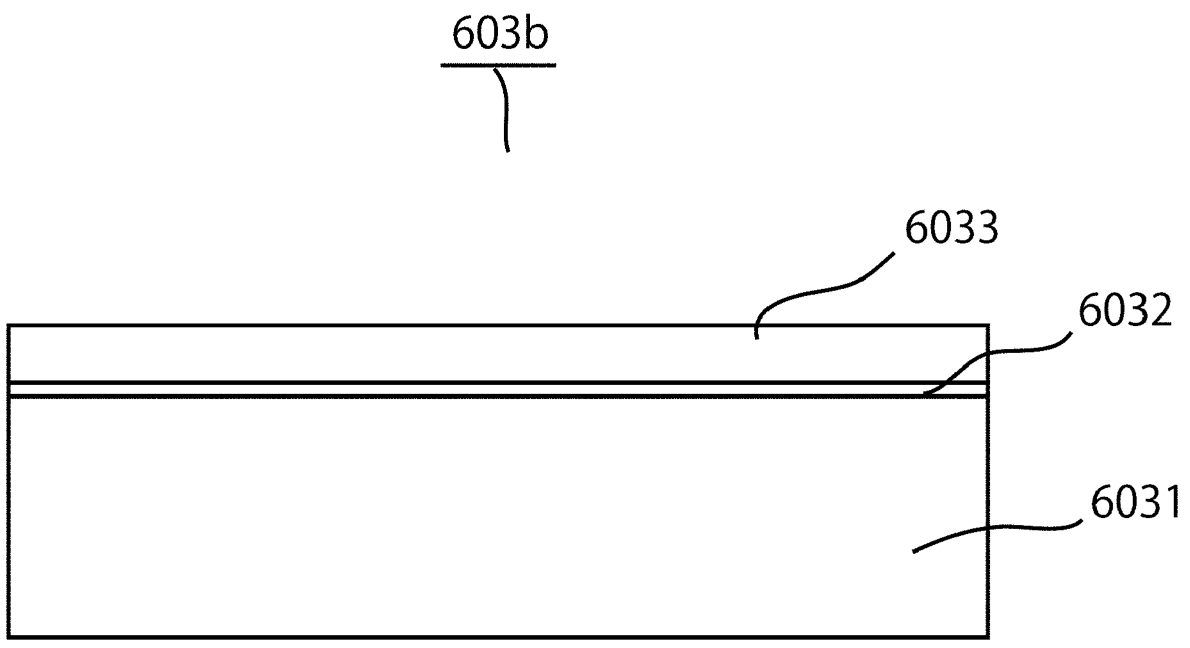

FIG. 16 is a sectional view of a pack-side seal.

Figure 17:
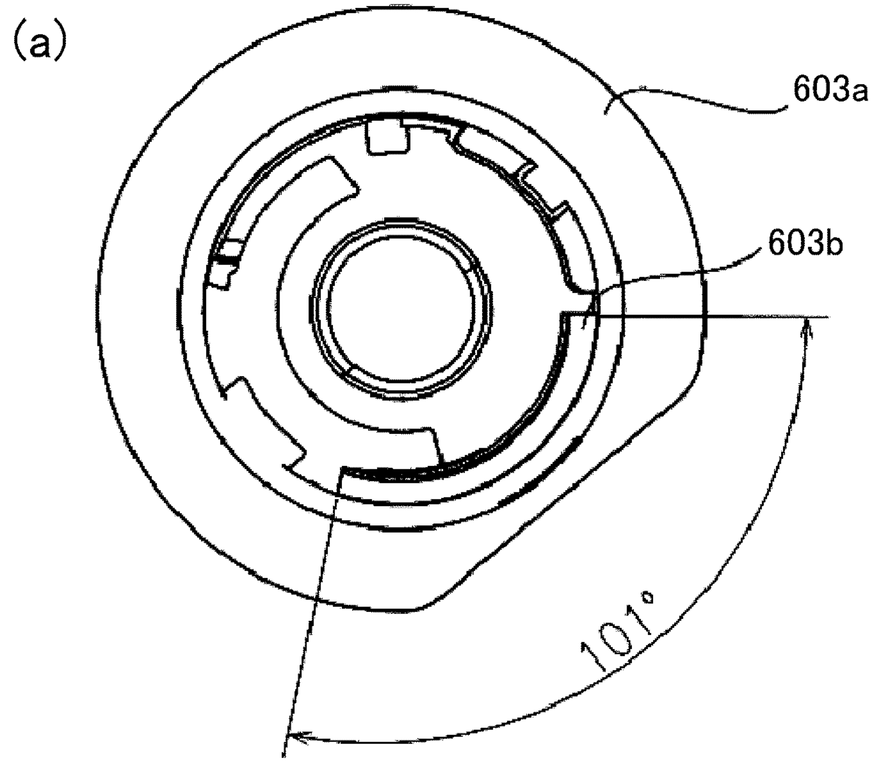
Figure 17:
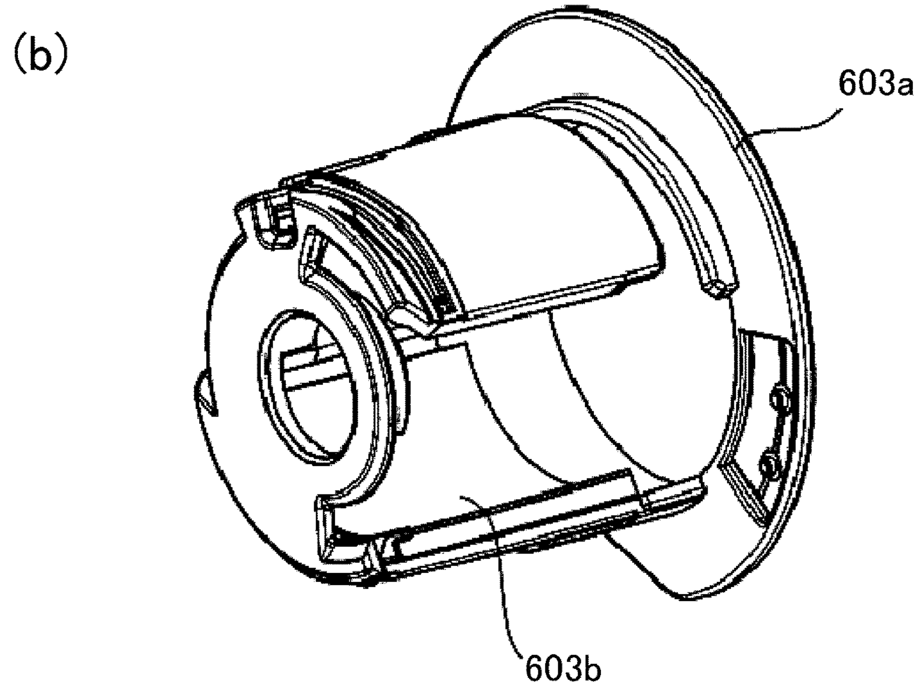

Parts (a) and (b) of FIG. 17 are schematic views showing a pack-side shutter.

Figure 18:
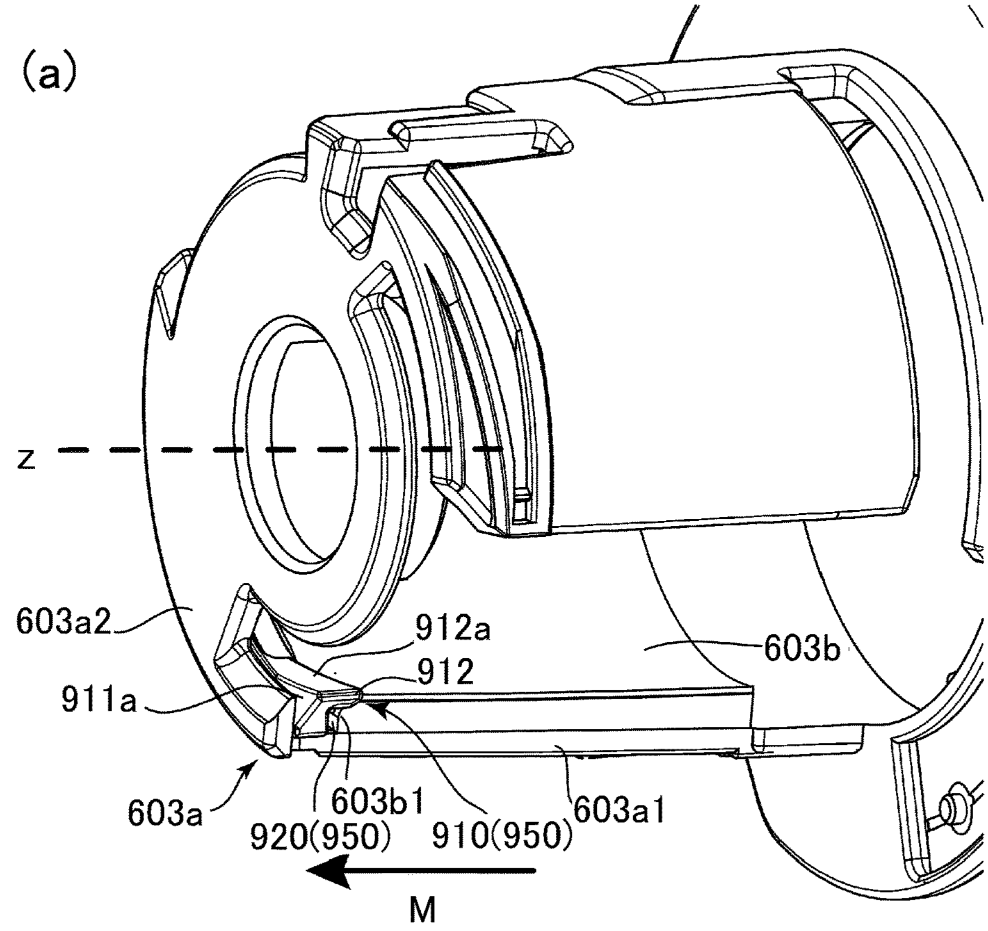
Figure 18:
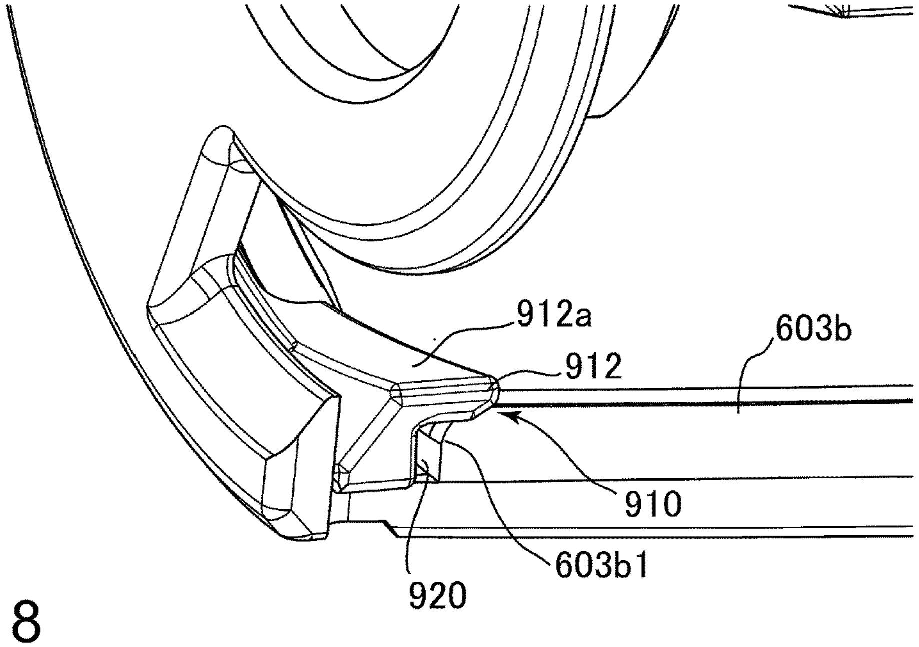

Parts (a) and (b) of FIG. 18 are perspective views showing a guiding portion.

Figure 19:
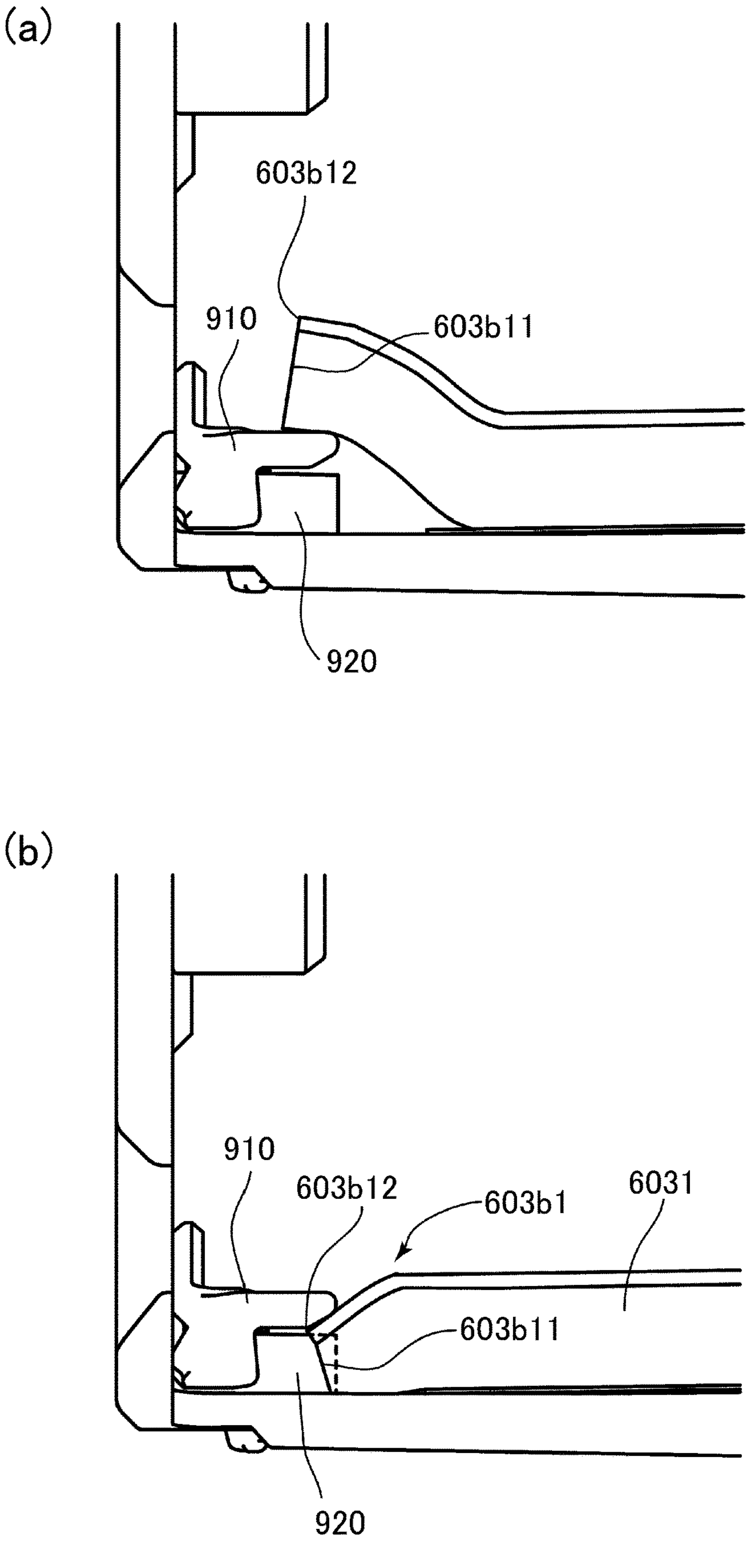

Parts (a) and (b) of FIG. 19 are schematic views for illustrating a mounting operation of an end portion of the pack-side seal.

Figure 20:
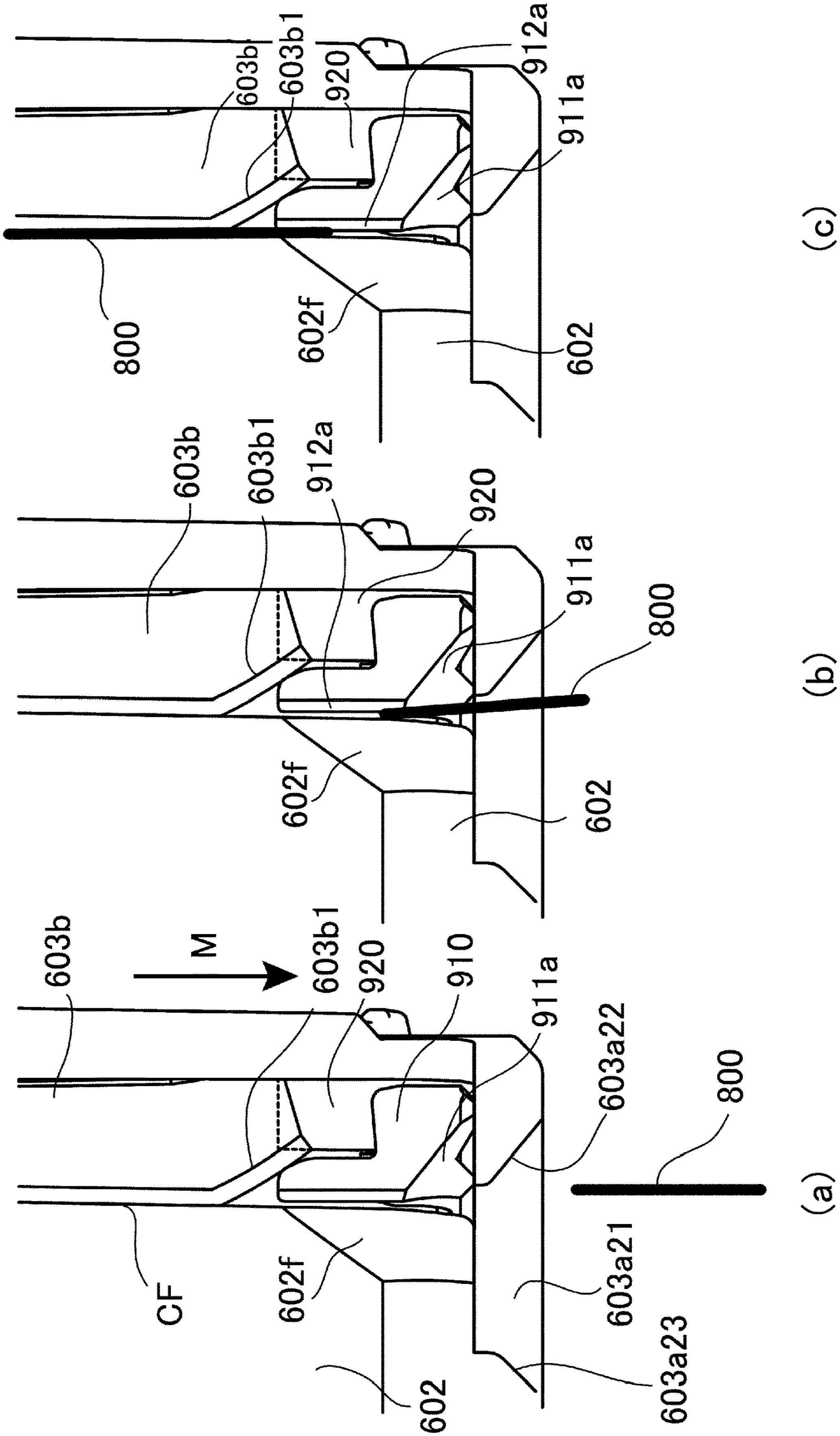

Parts (a) to (c) of FIG. 20 are schematic views for illustrating mask sheet inserting operation.

Figure 21:
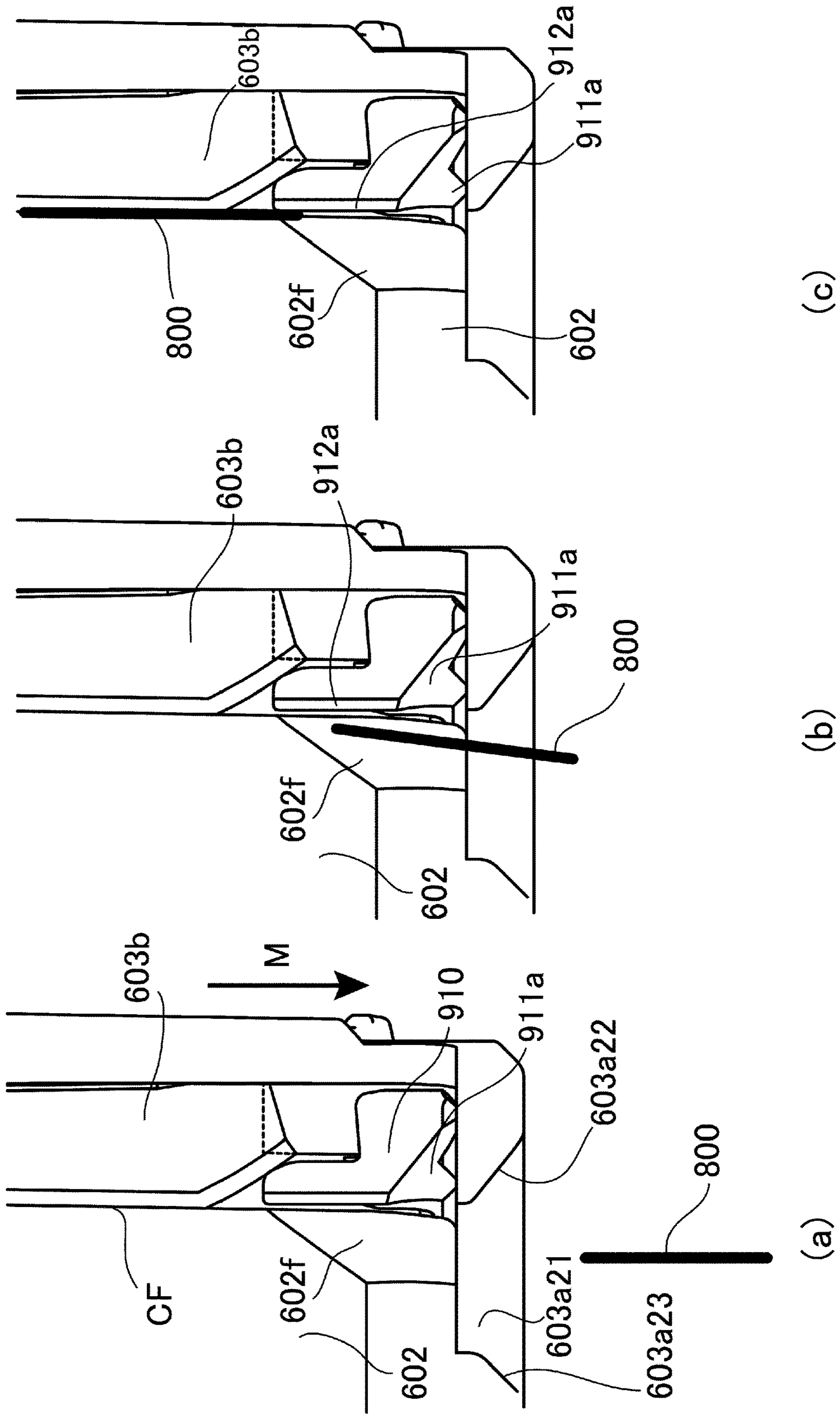

Parts (a) to (c) of FIG. 21 are schematic views for illustrating the mask sheet inserting operation.

Figure 22:
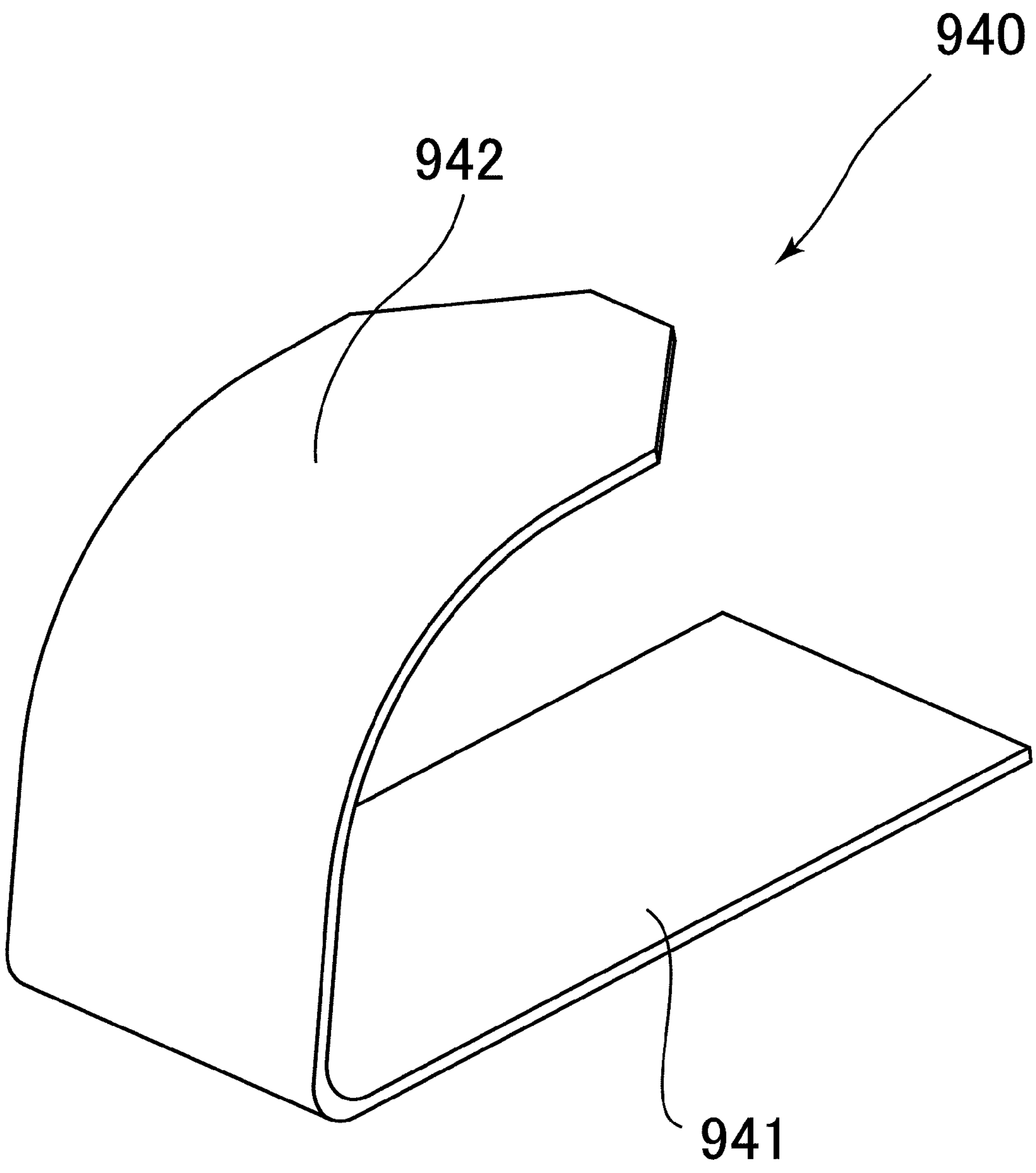

FIG. 22 is a perspective view of a guiding sheet in a second embodiment of the present invention.

Figure 23:
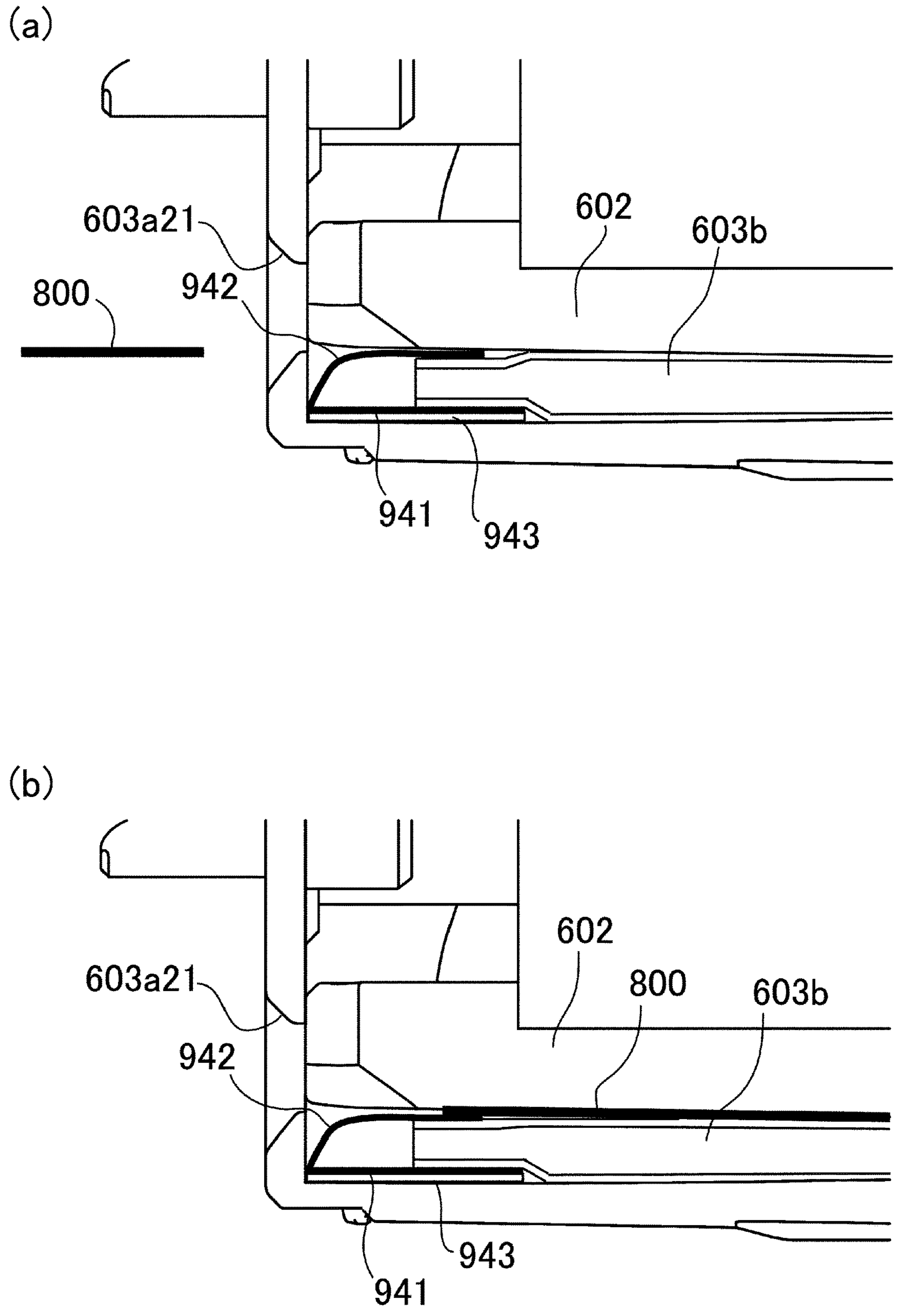

Parts (a) and (b) of FIG. 23 are schematic views for illustrating a mask sheet inserting operation in the second embodiment.

Figure 24:
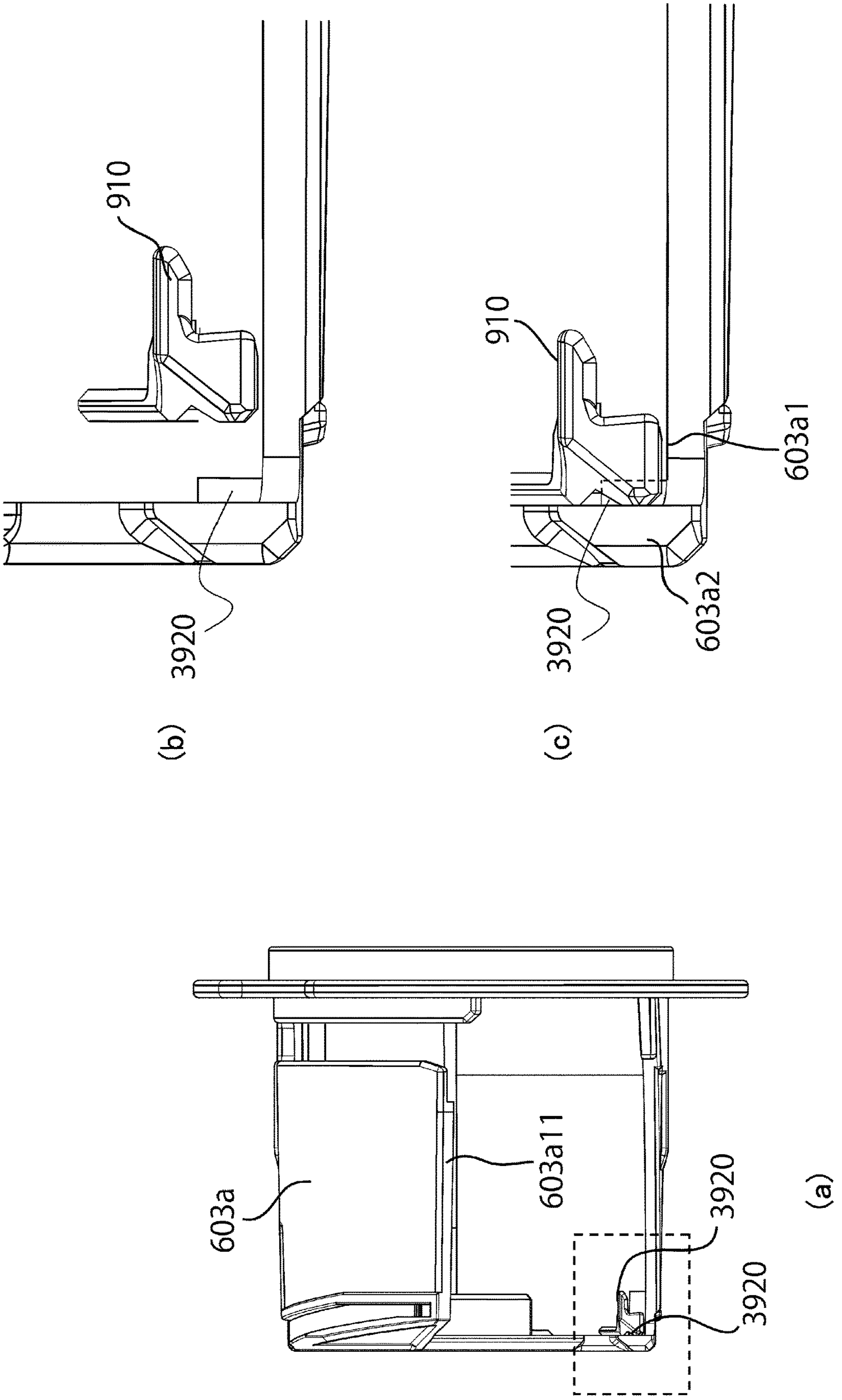

Parts (a) to (c) of FIG. 24 are side views showing a guide piece in a third embodiment.

Figure 25:
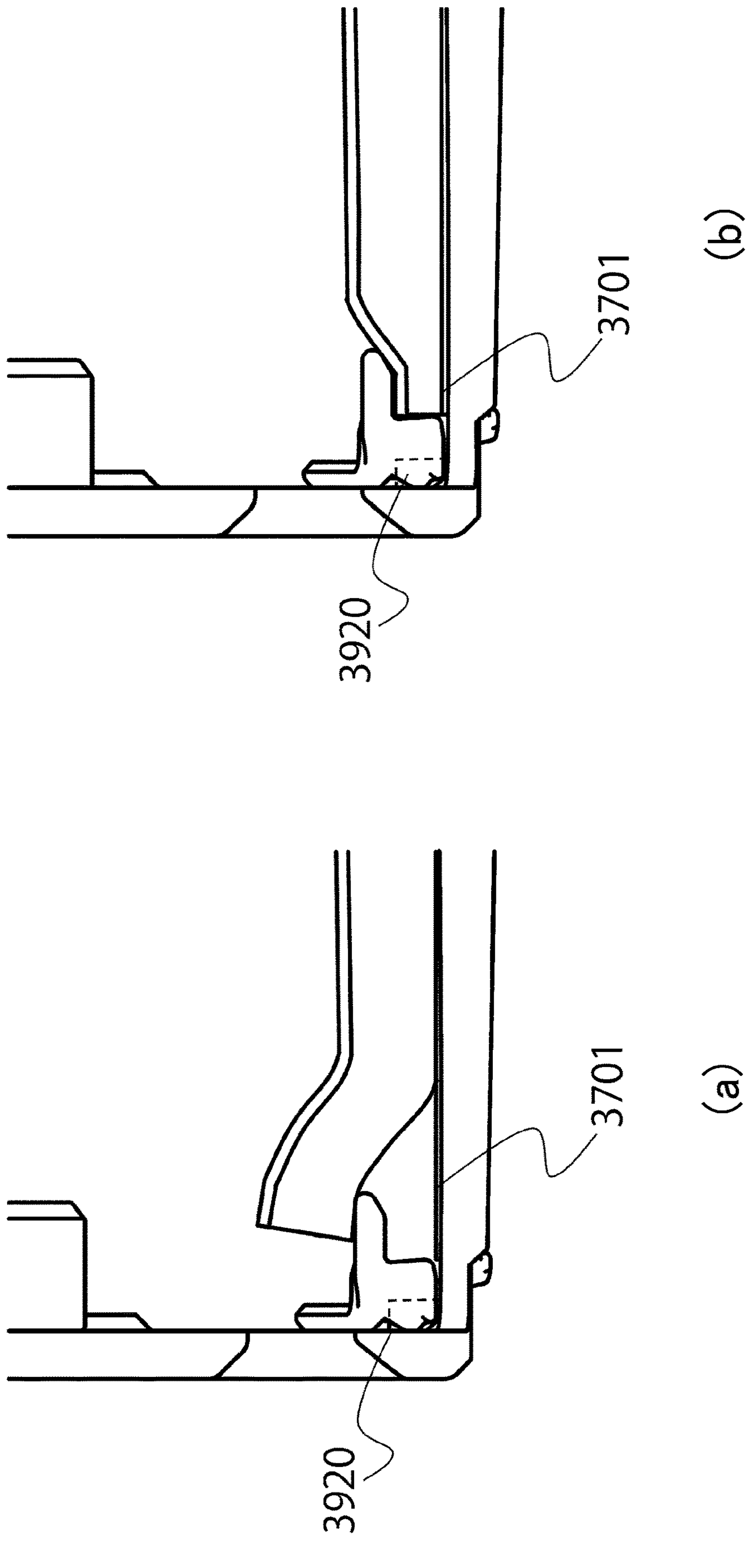

Parts (a) and (b) of FIG. 25 are schematic views for illustrating a pack-side seal mounting operation in the third embodiment.

Figure 26:
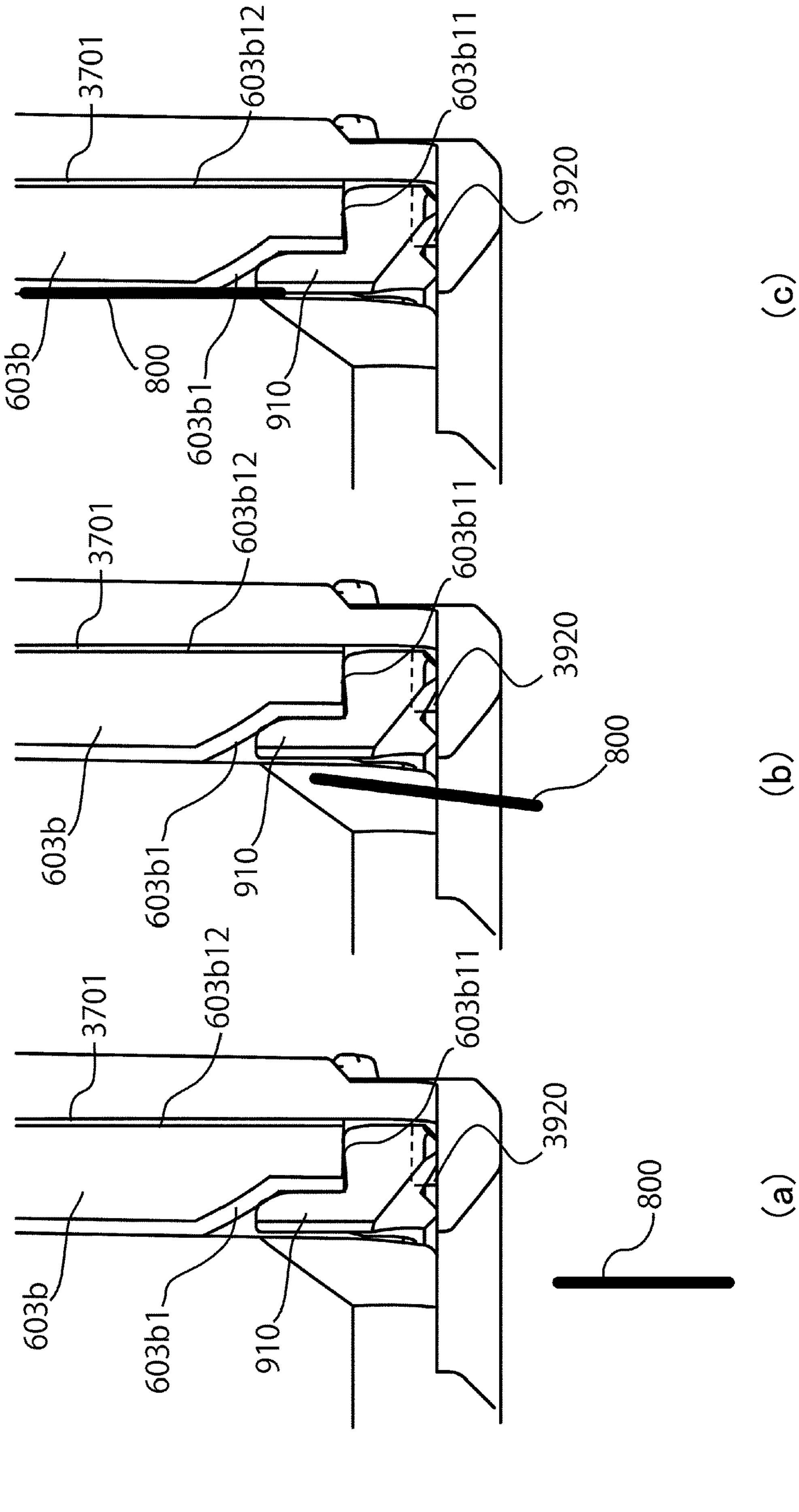

Parts (a) to (c) of FIG. 26 are schematic views for illustrating a mask sheet inserting operation.

Figure 27:
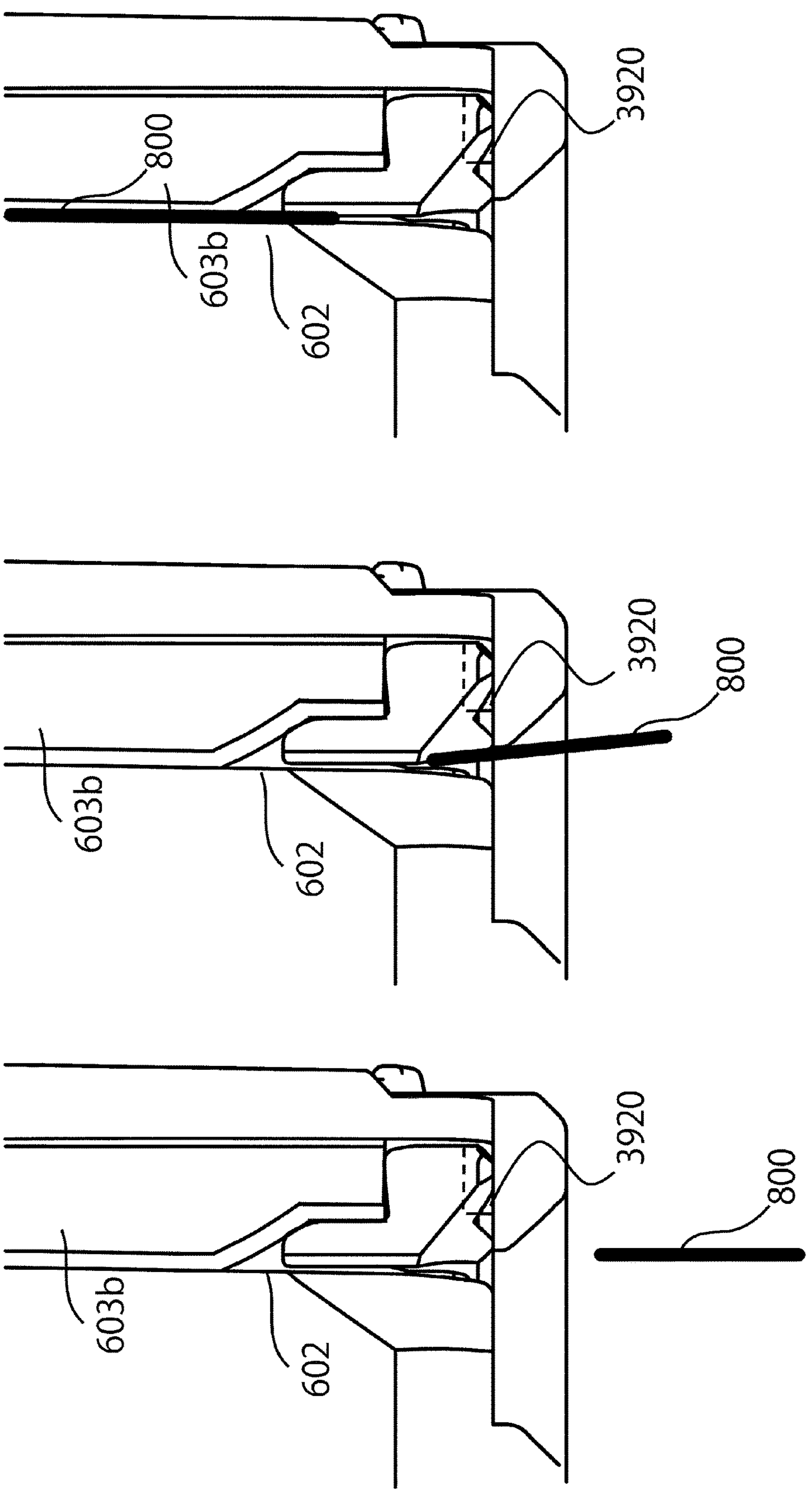

Parts (a) to (c) of FIG. 27 are schematic views for illustrating the mask sheet inserting operation.

DESCRIPTION OF THE EMBODIMENTS

In the following, exemplary embodiments for carrying out the present invention will be described while making reference to the drawings.

First Embodiment

Figure 1:
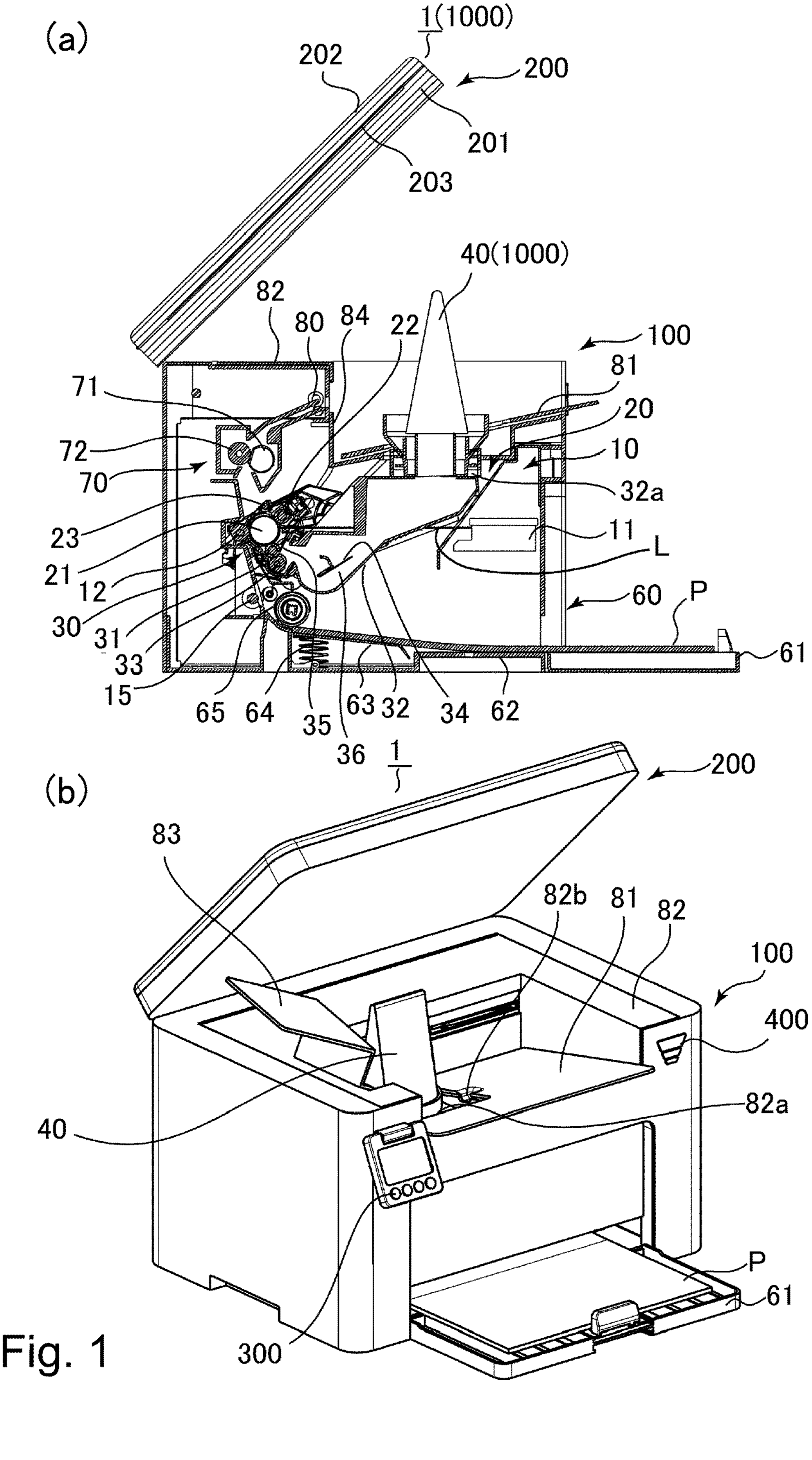

Part (a) of FIG. 1 is a schematic view showing a structure of an image forming apparatus 1 according to a first embodiment.

The image forming apparatus 1 is a monochromatic printer for forming an image on a recording material on the basis of image information inputted from an external device. In the recording material, various sheet materials different in material including papers such as plain paper and thick paper, a plastic film such as a sheet for an overhead projector, special-shaped sheets such as an envelope and index paper, a cloth, and the like are included.

[General Structure]

The image forming apparatus 1 includes, as shown in parts (a) and (b) of FIG. 1, a printer main assembly 100 as an apparatus main assembly, a reading device 200 supported so as to be openable relative to the apparatus main assembly 2, and an operating portion 300 mounted to an outer casing surface of the printer main assembly 100. The printer main assembly 100 includes an image forming portion 10 for forming a toner image on the recording material, a feeding portion 60 for feeding the recording material to the image forming portion 10, a fixing portion 70 for fixing the toner image, formed by the image forming portion 10, on the recording material, and a discharging roller pair 80.

The image forming portion 10 includes a scanner unit 11, a process cartridge 20 of an electrophotographic type, and a transfer roller 12 for transferring the toner image, formed on a photosensitive drum 21 of the process cartridge 20, onto the recording material. The process cartridge 20 includes the photosensitive drum 21, a charging roller 22 disposed at a periphery of the photosensitive drum 21, a pre-exposure device 23, and a developing device 30 including a developing roller 31.

The photosensitive drum 21 is a photosensitive member molded in a cylindrical shape. The photosensitive drum 21 in this embodiment includes, on a drum-shaped base material molded with aluminum, a photosensitive layer formed with a negatively chargeable organic photosensitive member. Further, the photosensitive drum 21 as an image bearing member is rotationally driven at a predetermined process speed in a predetermined direction (clockwise direction in the figure) by a motor.

The charging roller 22 contacts the photosensitive drum 21 at a predetermined press-contact force and forms a charging portion. Further, a desired charging voltage is applied to the charging roller 22 by a high charging voltage power source, so that the charging roller 22 electrically charges a surface of the photosensitive drum 21 uniformly to a predetermined potential. In this embodiment, the photosensitive drum 21 is charged to a negative polarity by the charging roller 22. The pre-exposure device 23 discharges (removes) a surface potential of the photosensitive drum 21, at a position in front of the charging portion in order to generate stable electric discharge at the charging portion.

The scanner unit 11 as a charging means irradiates the photosensitive drum 21, by using a polygonal mirror, with laser light corresponding to image information inputted from the external device or the reading device 200, so that the surface of the photosensitive drum 21 is subjected to scanning exposure. By this light exposure, an electrostatic latent image depending on the image information is formed on the surface of the photosensitive drum 21. Incidentally, the scanner unit 11 is not limited to a laser scanner device, but for example, an LED exposure device including an LED array in which a plurality of LEDs are arranged along a longitudinal direction of the photosensitive drum 21 may be employed.

The developing device 30 includes the developing roller 31 as a developer carrying member for carrying developer, a developing container 32, which is a frame for the developing device 30, and a supplying roller 33 capable of supplying the developer to the developing roller 31. The developing roller 31 and the supplying roller 33 are rotatably supported by the developing container 32. Further, the developing roller 31 is disposed at an opening of the developing container 32 so as to oppose the photosensitive drum 21. The supplying roller 33 rotatably contacts the developing roller 31, and toner as the developer accommodated in the developing container 32 is applied onto the surface of the developing roller 31 by the supplying roller 33. Incidentally, when a constitution capable of supplying the toner sufficiently to the developing roller 31 is employed, the supplying roller 33 is not necessarily be required.

The developing device 30 in this embodiment uses a contact development type as a development type. That is, a toner layer carried on the developing roller 31 contacts the photosensitive drum 21 at a developing portion (developing region) where the photosensitive drum 21 and the developing roller 31 oppose each other. To the developing roller 31, a developing voltage is applied by a high developing voltage power source. Under application of the developing voltage, the toner carried on the developing roller 31 is transferred from the developing roller 31 onto the drum surface in accordance with a potential distribution of the surface of the photosensitive drum 21, so that the electrostatic latent image is developed into a toner image. Incidentally, in this embodiment, a reversal development type is employed. That is, the toner image is formed by being deposited on a surface region of the photosensitive drum 21 attenuated in charge amount by being exposed to light in an exposure step after being charged in a charging step.

Further, in this embodiment, the toner, which is 6 μm in particle size and of which normal charge polarity is a negative polarity is used. As the toner in this embodiment, a polymerization toner formed by a polymerization method as an example is employed. Further, the toner in this embodiment is a so-called non-magnetic one-component developer which does not contain a magnetic component and in which the toner is carried on the developing roller 31 principally by an intermolecular force or an electrostatic force (mirror force). However, a one-component developer containing a magnetic component may also be used. Further, in the one-component developer, an additive (for example, wax or silica fine particles) for adjusting flowability and charging performance of the toner is contained in addition to toner particles in some cases. Further, as the developer, a two-component developer constituted by non-magnetic toner and a magnetic carrier may also be used. In the case where the developer having a magnetic property is used, as the developer carrying member, for example, a cylindrical developing sleeve inside of which a magnet is disposed is used.

The developing container 32 is provided with an accommodating portion 36 as a second toner accommodating portion and a stirring member 34 as a stirring means provided inside the accommodating portion 36. The stirring member 34 not only stirs the toner in the developing container 32 but also sends the toner toward the developing roller 31 and the supplying roller 33 by being rotated. Further, the stirring member 34 has a function of circulating the toner, peeled off from the developing roller 31 without being used for the development, in the developing container 32 and of uniformizing the toner in the developing container 32. Incidentally, the stirring member 34 is not limited to a rotatable form. For example, a stirring member in a swingable form may also be employed.

Further, at an opening of the developing container 32 where the developing roller 31 is disposed, a developing blade 35 for regulating an amount of the toner carried on the developing roller 31 is disposed. The toner supplied to the surface of the developing roller 31 passes through an opposing portion to the developing blade 35 with rotation of the developing roller 31, so that the toner is uniformly formed in a thin layer and is charged to the negative polarity by triboelectric charge.

A feeding portion 60 includes, as shown in parts (a) and (b) of FIG. 1, a front door 61 supported so as to be openable by the printer main assembly 100, a tray portion 62, an intermediary plate 63, a tray spring 64, and a pick-up roller 65. The tray portion 62 constitutes a bottom of a recording material accommodating space which appears by opening the front door 61, and the intermediary plate 63 is supported by the tray portion 62 so as to be capable of being raised and lowered. The tray spring 64 urges the intermediary plate 63 upward and presses the recording materials P, stacked on the intermediary plate 63, against the pick-up roller 65. Incidentally, the front door 61 closes the recording material accommodating space in a state in which the front door 61 is closed relative to the printer main assembly 100, and supports the recording materials P together with the tray portion 62 and the intermediary plate 63 in a state in which the front door 61 is opened relative to the printer main assembly 100.

The fixing portion 70 is of a heat fixing type in which an image fixing process is performed by heating and melting the toner on the recording material. The fixing portion 70 includes a fixing film 71, a fixing heater such as a ceramic heater for heating the fixing film 71, a thermistor for measuring a temperature of the fixing heater, and a pressing roller 72 press-contacting the fixing film 71.

Next, an image forming operation of the image forming apparatus 1 will be described. When an instruction of image formation is inputted to the image forming apparatus 1, on the basis of the image information inputted from an external computer connected to the image forming apparatus 1 or from the reading device 200, an image forming process by the image forming portion 10 is started. The scanner unit 11 emits the laser light toward the photosensitive drum 21 on the basis of the inputted image information. At this time, the photosensitive drum 21 is charged in advance by the charging roller 22, and is irradiated with the laser light, so that the electrostatic latent image is formed on the photosensitive drum 21. Thereafter, this electrostatic latent image is developed by the developing roller 31, so that the toner image is formed on the photosensitive drum 21.

In parallel to the above-described image forming process, the pick-up roller 65 of the feeding portion 60 sends the recording material P supported by the front door 61, the tray portion 62, and the intermediary plate 63. The recording material P is fed to a registration roller pair 15 by the pick-up roller 65, and is abutted against a nip of the registration roller pair 15, so that oblique movement of the recording material P is corrected. Then, the registration roller pair 15 is driven by being timed to a transfer timing of the toner image, and is conveyed toward a transfer nip formed by a transfer roller 12 and the photosensitive drum 21.

To the transfer roller 12, a transfer voltage power is applied from a high transfer voltage source, so that the toner image carried on the photosensitive drum 21 is transferred onto the recording material P conveyed by the registration roller pair 15. The recording material P onto which the toner image is transferred is conveyed to the fixing portion 70, where the toner image is heated and pressed when the recording material P passes through a nip between the fixing film 71 and the pressing roller 72 of the fixing portion 70. By this, toner particles are melted and are thereafter fixed, so that the toner image is fixed on the recording material P. The recording material P passed through the fixing portion 70 is discharged to outside of the image forming apparatus 1 (outside of the printer) by a discharging roller pair 80 as a discharging means, so that the discharged recording materials P are stacked on a discharge tray 81 as a stacking tray formed at an upper portion of the printer main assembly 100.

The discharge tray 81 is inclined upward toward a downstream in a discharging direction of the recording material P, and the recording material P discharged on the discharge tray 81 slides down on the discharge tray 81, so that a trailing end of the recording material is aligned by a restricting surface 84.

The reading device 200 includes a reading unit 201 in which an unshown reading portion is built, and a platen (pressure plate) 202 supported by the reading unit 201 so as to be openable (closable). At an upper surface of the reading unit 201, an original supporting platen glass 203 which permits transmission of light emitted from the reading portion and on which an original is to be placed.

In the case where a user intends to cause the reading device 200 to read an image of the original, the user places the original on the original supporting platen glass 203 in a state in which the platen 202 is opened. Then, the platen 202 is closed and a positional deviation of the original on the original supporting platen glass 203 is prevented, so that a reading instruction is outputted to the image forming apparatus 1 by operating the operating portion 300, for example. When a reading operation is started, the reading portion in the reading unit 201 reciprocates in a sub-scan direction, i.e., a left-right direction in a state in which the user faces the operating portion 300 of the image forming apparatus 1 on a front (surface) side. The reading portion receives light reflected by the original by a light receiving portion while emitting light from a light emitting portion toward the original, and photoelectrically converts the light, so that the reading portion reads the image of the original. Incidentally, in the following, on the basis of a state in which the user faces the operating portion 300 on the front side, a front-rear direction, the left-right direction, and an up-down direction are defined.

Figure 2:
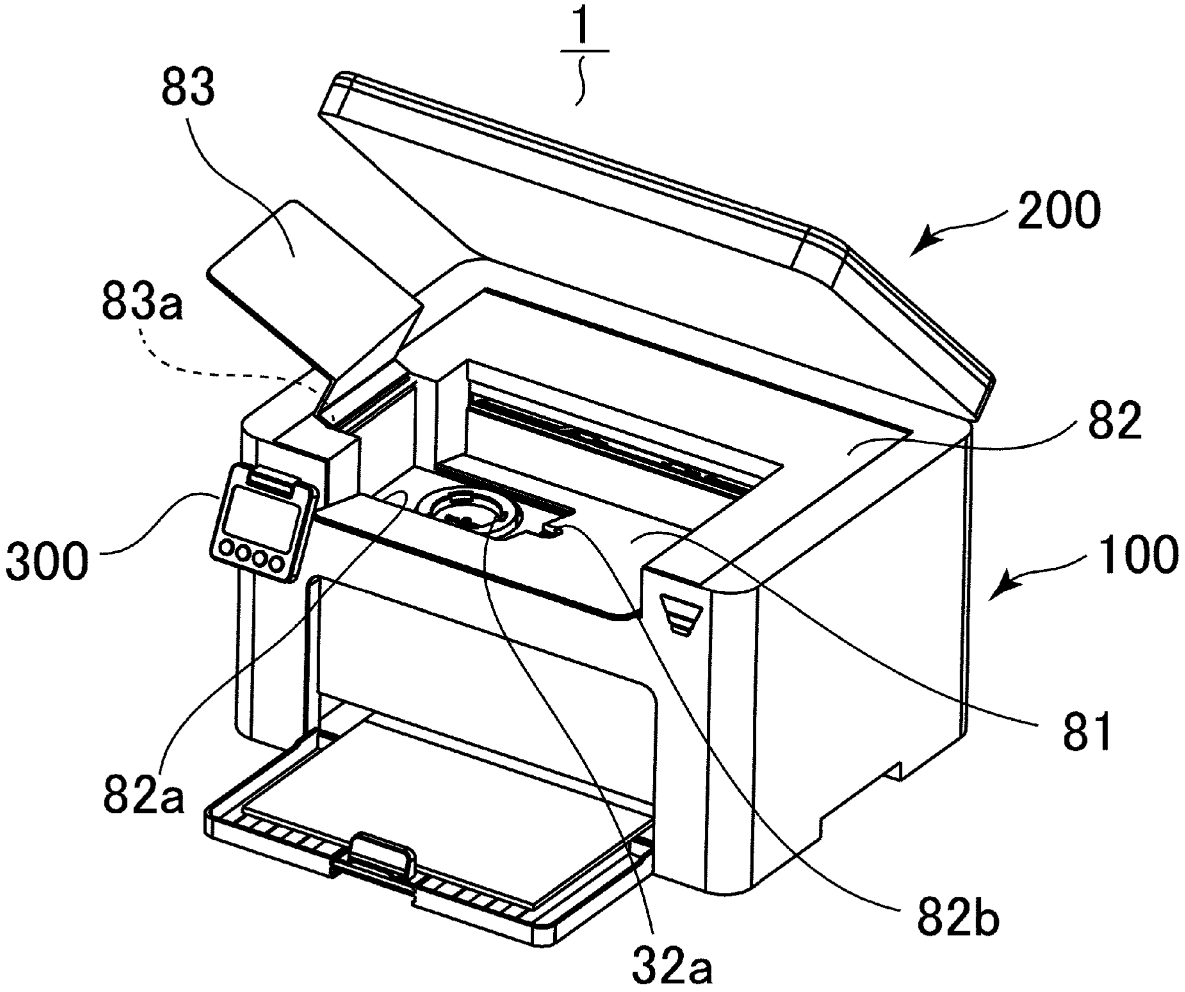
FIG. 2 is a perspective view showing the image forming apparatus in a state in which a reading device (apparatus) is open.

At an upper portion of the printer main assembly 100, a top cover 82 as a stacking tray is provided, and at an upper surface of the top cover 82, the discharge tray 81 as a stacking surface is formed. As shown in part (b) of FIG. 1 and FIG. 2, the openable member 83 is supported by the top cover 82 so as to be openable (closable) about a rotation shaft 83*a* extending in the front-rear direction. On the discharge tray 81 of the top cover 82, an opening 82*a* which opens upward is formed.

The openable member 83 is constituted so as to be movable between a closed position where the openable member 83 covers a mounting portion 600 so that a toner pack 40 cannot be mounted on the developing container 32 and an openable position where the mounting portion 600 is exposed so that the toner pack 40 can be mounted on the developing container 32. The openable member 83 functions as a part of the discharge tray 81 in the closed position. The openable member 83 and the opening 82*a* are formed on a left(-hand) side of the discharge tray 81. Further, the openable member 83 is opened in a left(-hand) direction by being hooked with user's finger(s) from a groove portion 82*b* provided on the top cover 82. The openable member 83 is formed in a substantially L-shape along a shape of the top cover 82.

The opening 82*a* of the discharge tray 81 opens so that the mounting portion 600 formed at the upper portion of the developing container 32 is exposed, and the openable member 83 is opened, so that the user can access to the supplying port 32*a*. Incidentally, in this embodiment, a type (direct supply type) in which the user supplies the toner from the toner pack 40 (see, parts (a) and (b) of FIG. 1), filled with the toner for supply, to the developing device 30 kept in a state in which the developing device 30 is mounted in the image forming apparatus 1 is employed. The toner pack 100 is exposed to the outside at least at a part thereof in a state in which the toner pack 40 is mounted in the image forming apparatus 1.

For this reason, in the case where a remaining toner amount of the process cartridge 20 becomes small, an operation in which the process cartridge 20 is taken out of the printer main assembly 100 and is exchanged with a new process cartridge becomes unnecessary, so that usability can be improved. Further, the toner can be supplied to the developing container 32 more inexpensively than exchange of entirety of the process cartridge 20. Incidentally, the direct supply type can be reduced in cost since there is no need to exchange various rollers and gears, and the like even when compared with the case where only the developing device 30 of the process cartridge 20 is exchanged. Incidentally, the image forming apparatus 1 and the toner pack 40 constitute an image forming system 1000.

[Structure of Toner Pack]

Figure 3:
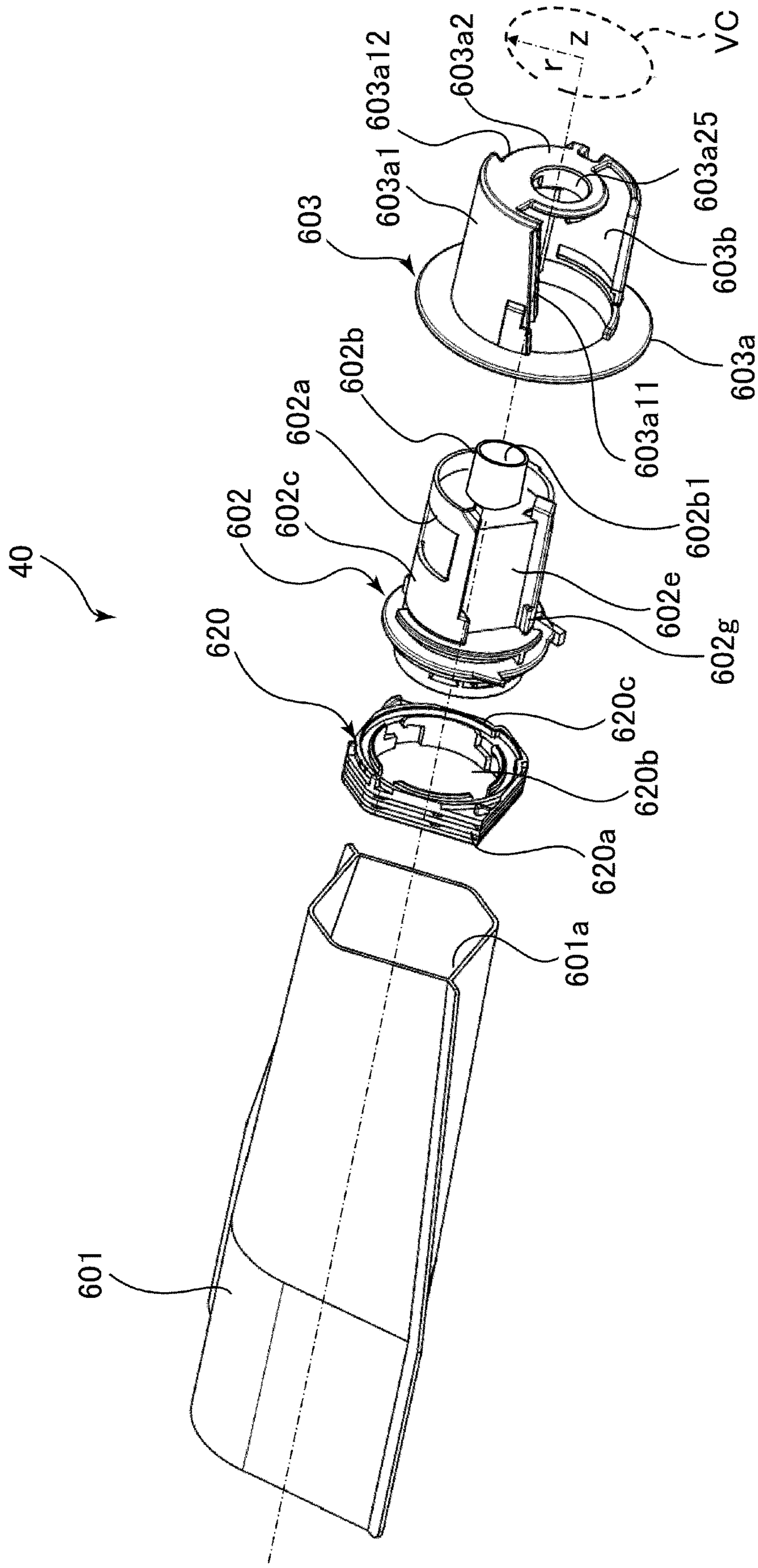
FIG. 3 is an exploded perspective view showing a toner pack.

Then, a structure of the toner pack 40 as a toner container will be described. The toner pack 40 includes, as shown in FIG. 3, a pouch 601 as a toner accommodating portion for accommodating the toner, an outer ring member 620 connected to the pouch 601, a nozzle 602 as a discharge portion, and a pack-side shutter 603. The pouch 601 is formed by, for example, a flexible polypropylene sheet, and has a bag shape such that one end portion thereof opens. Incidentally, the toner accommodating portion is not limited to the pouch 601, but may also be a bottle made of a resin material or a container made of paper or a vinyl resin material.

The outer ring member 620 is provided with a hole 620*b* therein through which the toner is capable of passing, and includes a bonding surface 620*a* bonded (fixed) to an opening 601*a* of the pouch 601 and a connecting portion 620*c* to which the nozzle 602 is connected on a side opposite from the pouch 601 side. The bonding surface 620*a* is bonded to the open 601*a* of the pouch 601 by means of various adhesives such as a hot-melt adhesive, or welding, or the like.

Further, the nozzle 602 is mounted on the connecting portion 620*c*. For this reason, when the toner is charged in the pouch 601, in a state in which the nozzle 602 is not mounted on the connecting portion 620*c*, the toner is supplied through the hole 620*b* of the outer ring member 620. The hole 620*b* is larger in area than a discharge opening 602*a* of the nozzle 602 described layer, and therefore, by doing so, the toner in a large amount can be charged in a shorter time without using a complicated device.

Inside the nozzle 602, a passage through which the toner supplied through the hole 620*b* of the outer ring member 620 passes, and a side surface (outer peripheral surface) 602*c* of the nozzle 602 is provided with a discharge opening 602*a* through which the toner in the pouch 601 is discharged to outside. Further, on the side surface 602*c* of the nozzle 602, a recessed portion 602*e* is provided in a position different from the position of the discharge opening 602*a* with respect to a circumferential direction. Further, at a bottom portion of the nozzle 602, a cylindrical projected portion 602*b* is provided.

The pack-side shutter 603 includes a pack-side shutter main body 603*a* and the pack-side sealing member 603*b*. The pack-side shutter main body 603*a* is a drum-type member having a closed-end cylindrical shape, and a bottom surface 603*a*2 thereof is provided with an insertion hole 603*a*25. The pack-side shutter main body 603*a* is externally mounted on the nozzle 602 in the form such that the insertion hole 603*a*25 is inserted in the projected portion 602*b* and thus is rotatable about a rotational axis z. That is, the pack-side shutter main body 603*a* is rotatably engaged with the nozzle 602.

For this reason, a cylindrical portion (hereinafter also referred to as a side surface) 603*a*1 of the pack-side shutter main body 603*a* is positioned outside the side surface 602*c* of the nozzle 602 with respect to a radial direction r of a virtual circle VC about the rotational axis z.

On an inner peripheral surface of the cylindrical portion 603*a*1, a substantially rectangular pack-side sealing member (nozzle seal) 603*b* is mounted. Further, the cylindrical portion 603*a*1 is provided with an opening 603*a*11. The pack-side sealing member 603*b* is formed so as to slide with the side surface 602*c* of the nozzle 602, and with respect to a rotational direction, a position where the pack-side sealing member 603*b* shields the discharge opening 602*a* of the nozzle 602 is a shielding position of the pack-side shutter 603. Further, a position where the discharge opening 602*a* of the nozzle 602 is exposed and opened from the opening 602*a*11 of the cylindrical portion 603*a*1 is an open position of the pack-side shutter 603. The pack-side shutter 603 is rotatable about the rotational axis z between the shielding position and the open position, and by rotating the pack-side shutter 603 from the shielding position to the open position, a state in which the toner in the pouch 601 is capable of being discharged is formed. Incidentally, in this embodiment, as the toner accommodating portion, the toner pack 40 provided with the pouch 601 was employed as the toner container. However, the present invention is not limited thereto, and for example, as the toner accommodating portion, a toner container provided with a fixed plastic container or the like may be used.

Incidentally, in this embodiment, the pack-side shutter 603 is constituted by including the pack-side shutter main body 603*a* and the pack-side sealing member 603*b*. However, for example, only the pack-side shutter main body 603*a* with no pack-side sealing member 603*b* may be regarded as the pack-side shutter. In this case, the pack-side shutter main body 603*a* is rotatable between an open position where the discharge opening 602*a* provided in the side surface 602*c* extending in the direction of the rotational axis z of the discharge portion 602 is open and a shielding position (closed position) where the discharge open 602*a* is shielded (closed). Further, in this case, it can be said that the pack-side sealing member 603*b* is a sealing member provided in the inner peripheral surface of the pack-side shutter main body (pack-side shutter) 603*a* directed inward with respect to the radial direction r of the virtual circle VC. Further, it can be said that this pack-side sealing member 603*b* is a sealing member constituted so as to seal between the inner peripheral surface of the pack-side shutter 603*a* and the outer peripheral surface of the discharge portion 602 when the pack-side shutter 603*a* is in the shielding position. Incidentally, in the following, a surface contacting the outer peripheral surface of the discharge portion 602 inside the pack-side sealing member 603*b* with respect to the radial direction r is referred to as a contact surface.

[Mounting Portion]

Then, a structure of a mounting portion 700 on which the toner pack 40 is to be mounted will be described. The mounting portion 700 is a unit for mounting the toner pack 40 as shown in parts (a) and (b) of FIG. 4. This mounting portion 700 includes a main body base portion 2 which is a fixing member, a lever 710 rotatable relative to the main body base portion 2, and an apparatus-side shutter 720.

The main body base portion 2 includes a first frame 730, a second frame 740, and a cover 750, and between the first frame 730 and the second frame 740, the above-described apparatus-side shutter 720 and the cover 750 are interposed. Specifically, the first and second frames 730 and 740 form a port portion 760 on which the toner pack 40 is mounted, in combination with each other. The first and second frames 730 and 740 also from a toner supply passage 770 along which the toner supplied from the toner pack 40 mounted on this port portion 760 is guided toward the accommodating portion 36 (see part (a) of FIG. 1) of the developing container 32.

The port portion 760 is constituted by a port base 741 of the second frame 740 supporting the apparatus-side shutter 720 and a cylindrical portion 731 of the first frame 730 mounted on the port base 741 from above. Further, the toner supply passage 770 is formed in such a manner that a part of the cylindrical portion 731 of the first frame 730 is open as a toner receiving opening 732 and a cover portion of the first frame 730 covers between the toner receiving opening 732 and an opening 742 of the second frame 740. The opening 742 of the second frame 740 communicates with the accommodating portion 36 of the developing container 32, and when the toner is supplied through the above-described toner receiving opening 732, the toner is supplied to the accommodating portion 36 of the developing container 32.

The apparatus-side shutter 720 includes an apparatus-side shutter main body 721 and an apparatus-side sealing member 722. The apparatus-side shutter main body 721 is a drum-type member having a closed-end cylindrical shape and is mounted on the part base 741 of the second frame 740 so as to be rotatable about the rotational axis z. Further, a cylindrical portion 721*a* of the apparatus-side shutter main body 721 is provided with a communication opening 721*b*. Further, onto the inner peripheral surface of the cylindrical portion 721*a*, the above-described apparatus-side sealing member 722 is applied so as to enclose a periphery of the communication opening 721*b*. In addition, on a bottom surface of the apparatus-side shutter 720, a center boss 721*c* with which the projected portion 602*b* of the nozzle 602 is engaged is provided.

With respect to the radial direction r of the virtual circle VC about the rotational axis z, a side surface of the above-described cylindrical portion 721*a* is positioned inside the toner receiving opening 732, and a position where the side surface shields the toner receiving opening 732 is a shielding position (see part (a) of FIG. 5) of the apparatus-side shutter 720. Further, a position where the communication opening 721*b* of the cylindrical portion 721*a* and the toner receiving opening 732 oppose each other and where the toner receiving opening 732 opens is an open position (see part (b) of FIG. 5). The apparatus-side shutter 720 is rotatable about the rotational axis z between the shielding position and the open position, and the apparatus-side shutter 720 is rotated from the shielding position to the open position, whereby a state in which the toner is capable of being supplied to the developing container 32 is formed.

The cover 750 includes a cover base 751 mounted coaxially with the center boss 721*c* of the apparatus-side shutter 720 and a wall portion 752 standing from this cover base 751. At an upper end portion of the wall portion 752, a portion-to-be-engaged 753 with which a positioning portion 734 of the first frame 730 is engaged is provided. By engagement of the positioning portion 734 with the portion-to-be-engaged 753, the cover 750 is prevented from rotating about the rotational axis z relative to the first frame 730. The wall portion 752 is positioned inside the side surface of the apparatus-side shutter 720 with respect to the radial direction r of the virtual circle VC and is configured so as to slide with the apparatus-side sealing member 722 at an outer peripheral surface thereof. Further, when the apparatus-side shutter 720 is in the above-described shielding position, the communication opening 721*b* of the apparatus-side shutter 720 is positioned in a direction of the wall portion 752 and is blocked by the wall portion 752.

The lever 710 is mounted so as to be rotatable about the rotational axis z relative to the first frame 730, and includes a drive transmitting portion 711 and an operating portion 712. The user can rotate the lever 710 about the rotational axis z by operating the operating portion 712. The drive transmitting portion 711 of the lever 710 is constituted by a projected portion projecting inward from the inner peripheral surface with the rotational axis z of the lever 710 as a center with respect to the radial direction r.

Incidentally, at an upper end portion of the cylindrical portion 721*a* of the apparatus-side shutter 720, a portion 723 to which a driving force from the drive transmitting portion 711 of the lever 710 is transmitted is formed. However, the drive transmitting portion 711 of the lever 710 and the portion 723, to which the drive is transmitted, of the apparatus-side shutter are not drive-connected with each other in a state in which the toner pack 40 is mounted on the mounting portion 700. The drive transmitting portion 711 and the portion 723 to which the drive is transmitted are not connected with each other until the drive transmitting portion 711 and the portion 723 are engaged with a recessed portion 603*a*12 (see FIG. 3), to which the drive is transmitted, provided on the outer peripheral surface of the cylindrical portion 603*a*1 of the pack-side shutter 603. For this reason, in the state in which the toner pack 40 is not mounted on the mounting portion 700, even when the lever 710 is rotationally operated, the apparatus-side shutter 720 is not rotated.

[Mounting of Toner Pack on Mounting Portion]

Next, mounting of the toner pack 40 onto the mounting portion 700 will be described. As shown in part (a) and (b) of FIG. 6, the toner pack 40 is mounted on the mounting portion 700 in a state in which the pack-side shutter 603 and the apparatus-side shutter 720 are in the shielding positions. When the toner pack 40 is mounted on the mounting portion 700, as regards the toner pack 40, the recessed portion 602*e* of the nozzle 602 exposed through the opening 603*a*11 of the pack-side shutter 603 is aligned with the positioning portion 734 of the first frame 730. Further, the portion 603*a*12, to which the drive is transmitted, of the pack-side shutter 603 is aligned with the drive transmitting portion 711 of the lever 710. Further, in this state, by inserting the toner pack 40 in a mounting direction M, the toner pack 40 is mounted on the mounting portion 700.

When the toner pack 40 is completely mounted on the mounting portion 700, the center boss 721*c* (see FIG. 5) of the apparatus-side shutter 720 is engaged with the inner peripheral surface 602*b*1 (see FIG. 3) of the projected portion 602*b* of the nozzle 602. By this, not only a position of the nozzle 602 relative to the apparatus-side shutter 720 with respect to the radial direction r is determined, but also a position of the toner pack 40 with respect to the mounting direction M is determined.

Further, the recessed portion 602*e* of the nozzle 602 is aligned with the positioning portion 734 of the first frame 730 and the toner pack 40 is mounted, whereby the wall portion 752 of the cover 750 is engaged with the recessed portion 602*e* of the nozzle 602. The wall portion 752 of the cover 750 is a guiding member for guiding the nozzle 602 so that the nozzle 602 can be smoothly inserted in the mounting direction M. By this, the nozzle 602 is smoothly inserted while being roughly positioned with respect to the rotational direction. Further, the nozzle 602 includes a pair of positioning projections (projected portions) 602*g* (see FIG. 3) projected toward the recessed portion 602*e* at an upstream end portion thereof with respect to the mounting direction member of the recessed portion 602*e*. Then, the positioning projections 602*g* are engaged with the positioning portion 734 of the first frame 730, whereby the discharge opening 602*a* is positioned in a state in which the discharge opening 602*a* opposes the receiving opening 732 of the port portion 760. Further, the nozzle 602 of the toner pack 40 is incapable of being rotated relative to the port portion 760. That is, the wall portion 752 constitutes a mounting guide for guiding the nozzle 602 in the direction of the rotational axis z in engagement with a part of the nozzle 602.

Further, the portion 603*a*12, to which the drive is transmitted, of the pack-side shutter 603 is engaged with the drive transmitting portion 711 of the lever 710 and the portion 723, to which the drive is transmitted, of the apparatus-side shutter 720. By this, the lever 710, the pack-side shutter 603, and the apparatus-side shutter 720 and drive-connected with each other, so that the pack-side shutter 603 and the apparatus-side shutter 720 and moved between the shielding position and the open position in interrelation with a rotating operation of the lever 71.

When the toner pack 40 is mounted on the mounting portion 700, the user operates the lever 710, so that the pack-side shutter 603 and the apparatus-side shutter 700 is rotated from the shielding position to the open position, and thus the supply of the toner from the toner pack 40 to the developing container 32 is carried out. When the supply of the toner from the toner pack 40 to the developing container 32 is completed, the user rotates the lever 710 from the open position to the closed position, and then pulls out the toner pack 40 from the mounting portion 700.

[Mask Sheet]

Next, a mask sheet 800 will be described based on FIGS. 7 to 9. Incidentally, FIG. 7 is a perspective view of the cover 750, and FIGS. 8 and 9 are sectional views of the mounting portion 700 in a state in which the toner pack 40 is mounted on the mounting portion 700. Parts (a) and (b) of FIG. 8 are the sectional views showing the case where the shutters 603 and 720 are in the shielding positions, and parts (a) and (b) of FIG. 9 are the sectional views showing the case where the shutters 603 and 720 are in the open positions. Incidentally, FIGS. 8 and 9 are the sectional views cut at positions where the wall portion 752 is cut.

As shown in parts (a) and (b) of FIG. 7, on an outer periphery of the wall portion 752 of the cover 750, the mask sheet 800 which is a film of, for example, about 100 μm in thickness is fixed with a double-side tape or the like. This mask sheet 800 is, as shown in FIGS. 8 and 9, formed so that an end 801 thereof on the toner receiving opening 732 side projects more than an end surface 7521 of the wall portion 752 does. Further, the mask sheet 800 masks a region so that a portion projected from the wall portion 752 covers a gap (boundary) G between the nozzle 602 and the wall portion 752 on an inside of the pack-side sealing member 603*b* and on an inside of the apparatus-side sealing member 722 with respect to the radial direction. That is, the mask sheet 800 extends over the gap G between the nozzle 602 and the wall portion 752.

When the pack-side shutter 603 and the apparatus-side shutter 720 are moved between the shielding position and the open position, the communication opening 721*b* of the apparatus-side shutter 720 passes through an outside of the gap G with respect to the radial direction.

That is, the boundary portion G between the wall portion 752 and the nozzle 602 is positioned in a position where the apparatus-side shutter 720 opposes the communication opening 721*b* with respect to the radial direction r during rotation of the apparatus-side shutter 720 from the open position to the shielding position. When the supply of the toner from the toner pack 40 is carried out, remaining toner exists inside the apparatus-side sealing member 722 enclosing the communication opening 721*b*. In this state, in the case where the shutters 603 and 720 are moved from the open position toward the shielding position for dismounting the toner pack 40, there is a liability that the toner remaining on the inside of the apparatus-side sealing member 722 leaks out from the gap G. Particularly, different from between the positioning projection 602*g* and the positioning portion 734 of the first frame 730 which are used for performing the above-described positioning, the wall portion 752 and the recessed portion 602*e* are constituted for guiding the nozzle 602 in the mounting direction while roughly determining a relative position therebetween with respect to the rotational direction. Accordingly, the gap G between the wall portion 752 and the nozzle 602 is larger than the above-described portion where the above-described positioning is carried out, so that the toner is liable to enter the gap G.

In this embodiment, as described above, the mask sheet 800 covers the gap G on the pack side and on the inside of the pack-side sealing member 603*b* and on the inside of the apparatus-side sealing member 722 with respect to the radial direction, and therefore, leakage of the toner from this gap G is prevented. Incidentally, in the state in which the toner pack 40 is mounted on the mounting portion 700, end surfaces of the pack-side sealing member 603*b* and the apparatus-side sealing member 722 overlap with each other with respect to a circumferential direction and are press-contacted to each other. For this reason, a sealing property is improved, so that a degree of the toner leakage from between the pack-side sealing member 603*b* and the apparatus-side sealing member 722 is reduced.

[Guiding Portion]

Next, a guiding portion 900 for guiding the mask sheet 800 will be described. As shown in parts (a) and (b) of FIG. 10, the bottom surface (bottom portion) **603*a*2 of the pack-side shutter main body 603*a* is provided with the opening 603*a*21 for permitting insertion engagement of the mask sheet 800. When the toner pack 40 is mounted on the mounting portion 700, the mask sheet 800 passes through the opening 603*a*21 and is inserted and engaged between the pack-side sealing member 603*b* and the nozzle 602. However, as described above, the mask sheet 800 is the film of about 10 μm in the thickness. Further, a predetermined distance exists from the bottom surface (bottom portion) 603*a*2 of the pack-side shutter main body 603*a* to the downstream end portion 603*b*1 of the pack-side sealing member 603*b* with respect to the mounting direction M of the toner pack 40. For this reason, depending on a position and an attitude of the toner pack 40 during the mounting, there was a liability that the mask sheet 800 contacts the end surface of the end portion 603*b*1 of the pack-side sealing member 603*b*** and causes folding thereof.

For this reason, in this embodiment, between the bottom surface **603*a*2 of the pack-side shutter main body 603*a* and the end portion 603*b*1 of the pack-side sealing member 603*b*, the guiding portion 900 is provided for inducing the mask sheet 800 into between the nozzle 602 and the pack-side sealing member 603*b*. The guiding portion 900 is constituted by including a guide piece 910, a rib 920, the pack-side sealing member 603*b*, and the inside 602*f* of the nozzle 602. First, the guide piece 910 and the inside 602*f* of the nozzle 602 which first guide the mask sheet 800 during the mounting of the toner pack 40** will be described in the following.

As shown in part (a) of FIG. 20, the opening **603*a*21 of the pack-side shutter main body 603*a* opens in the form such that the opening 603*a*21 becomes broad toward the downstream side of the mounting direction M. Specifically, an end surface 603*a*22 on an outside with respect to the radial direction overlaps with the pack-side sealing member 603*b* on an outside of the contact surface CF with respect to the radial direction as viewed in the mounting direction M so that the contact surface CF between the side surface of the nozzle 602 and the pack-side sealing member 603*b* exists within the width range of the opening 603*a*21. The end surface 603*a*23 on the inside with respect to the radial direction overlaps with the nozzle 602** on the inside of the contact surface CF with respect to the radial direction as viewed in the mounting direction M.

For this reason, as shown in part (a) of FIG. 20, as viewed in the mounting direction M, the toner pack 40 is mounted on the mounting portion 700 in some cases in a positional relationship such that the mask sheet 800 and the pack-side member **603*b* overlap with each other with respect to the radial direction. Further, in the case where the attitude of the toner pack 40 is inclined, the toner pack 40 is mounted on the mounting portion 700 in some instances in the form such that the toner pack 40 is inclined so that the pack-side sealing member 603*b* moves toward the mask sheet 800**.

In the case as described above, the mask sheet 800 is guided toward the contact surface CF between the side surface of the nozzle 602 and the pack-side sealing member **603*b* along the inclined surface 911*a* of the guide piece 910. Specifically, the guide piece 910 is roughly divided into three portions (first to third portions) 911 to 913 as shown in FIGS. 11 and 12. The first portion 911 is a portion where the above-described inclined surface 911*a* is formed. In this first portion 911, the inclined surface 911*a* is formed in a manner such that a part of an end surface (opposite from the pouch 601 with respect to the direction of the rotational axis z) facing the bottom surface 603*a*2 of the pack-side shutter main body 603*a*** is cut away.

The guide piece 910 is, as shown in part (a) of FIG. 18, formed along the between surface **603*a*2 and the side surface 603*a*1 of the pack-side shutter main body 603*a*** formed in the drum shape.

Further, the inclined surface **911*a* is formed so as to be inclined with respect to the direction of the rotational axis z and the circumferential direction of the pack-side shutter main body 603*a*. That is, the inclined surface 911*a* is inclined outward with respect to the radial direction toward the bottom surface 603*a*2 from the pouch 601** side in the direction of the rotational axis z.

Specifically, for example, with respect to the direction of the rotational axis z, a direction from the pouch 601 as the toner accommodating portion toward the nozzle 602 as the discharge portion is taken as a first direction, and a direction opposite to the first direction is taken as a second direction. A downstream end portion of the pack-side sealing member **603*b* with respect to the first direction is a first end portion 603*b*1. In this case, the guide piece 910 as the guiding portion includes a downstream end portion which is positioned downstream of the first end portion 603*b*1 of the pack-side sealing member 603*b* with respect to the first direction and which overlaps with the pack-side sealing member 603*b* as viewed in the direction of the rotational axis z. Further, the inclined surface 911*a* is formed at this downstream end portion. The inclined surface 911*a* is, as shown in part (a) of FIG. 10 and part (a) of FIG. 18, inclined so as to approach the contact surface of the pack-side sealing member 603*b* toward the second direction as viewed in a direction perpendicular to the direction of the rotational axis z. In other words, it can be said that the inclined surface 911*a* is inclined downward toward the downstream side of the mounting direction Min part (a) of FIG. 10 and part (a) of FIG. 18**.

Further, with respect to the circumferential direction, the inclined surface **911*a* is inclined outward with respect to the radial direction toward the opening 603*a* of the pack-side shutter main body 603*a* (counterclockwise as viewed in a direction from a side opposite from the pouch 601 toward the bottom surface 603*a*2). That is, the inclined surface 911*a* is inclined toward the first direction toward a direction from the shielding position to the open position of the pack-side shutter 603** with respect to the rotational direction.

For this reason, as shown in FIG. 10, the inclined surface **911*a* is constituted so that an interval between itself and the nozzle 602 increases on a side toward a downstream of the mounting direction M. That is, the inclined surface 911*a* is inclined so as to be spaced from the nozzle 602 (rotational axis z) in the second position, more remote from the pack-side sealing member 603*b***, than in the first position with respect to the direction of the rotational axis z.

The second portion 912 of the guide piece 910 is an extended portion extended from an upper end (inside end of a circle about the rotational axis z with respect to the radial direction) in FIG. 11 toward the upstream side with respect to the mounting direction M, i.e., toward the pack-side sealing member **603*b* with respect to the direction of the rotational axis z. The upper surface of the second portion 912 in FIG. 11 (inside surface with respect to the radial direction, hereinafter, this surface is referred to as a connecting surface) 912*a* is a surface continuous to the inclined surface 911*a* on the downstream side of the mounting direction M. Further, the connecting surface 912*a* is connected to the inner peripheral surface (contact surface) of the pack-side sealing member 603***b*.

The third portion 913 of the guide piece 910 is a portion extended in the circumferential direction while sandwiching a recessed mounting portion 914 between itself and the first portion 911. This third portion 913 is positioned with respect to the direction of the rotational axis z of the guide piece 910 by contact of the end portion 913*a* on the downstream side of the mounting direction M with the bottom surface 603*a* of the pack-side shutter main body 603*a*.

The rib 920 is, as shown in FIG. 13, a rectangular rib formed along the side surface (inner peripheral surface) 603*a*1 from the bottom surface 603*a*2 of the pack-side shutter main body 603*a* in the direction of the rotational axis z in the neighborhood of an edge portion of the opening 603*a*11 of the pack-side shutter main body 603*a* on one end side. On this rib 920, as shown in FIGS. 14 and 15, the recessed mounting portion 914 of the guide piece 910 is mounted while being slid in the direction of the rotational axis z, and by this, the guide piece 910 is mounted on the pack-side shutter main body 603*a*. Incidentally, in this embodiment, the guide piece 910 is formed as a separate member from the pack-side shutter main body 603*a*, but may be formed together with the rib 920 integrally with the pack-side shutter main body 603*a*. Further, by the guide piece 910 and the rib 920, a guiding portion 950 for guiding the mask sheet 800 is formed (see part (a) of FIG. 18).

On the other hand, the inclined surface 602*f* of the nozzle 602 is formed so as to oppose the guide piece 910 at the downstream end portion of the nozzle 602 with respect to the mounting direction M. Specifically, the inclined surface 602*f* is formed by being inclined with respect to the direction of the rotational axis z and the circumferential direction of the pack-side shutter main body 603*a*. That is, with respect to the direction of the rotational axis z, the inclined surface 602*f* is inclined inward with respect to the radial direction toward the bottom surface 603*a*2 side from the pouch 601 side. In other words, in part (a) of FIG. 10, the inclined surface 602*f* is inclined upward toward the downstream side of the mounting direction M. Further, with respect to the circumferential direction, the inclined surface 602*f* is inclined inward with respect to the radial direction as the inclined surface 602*f* is spaced from the opening 603*a*11 of the pack-side shutter main body 603*a* (counterclockwise as viewed from a side opposite from the pouch 601 toward the bottom surface 603*a*2. Further, with respect to the direction of the rotational axis z, the inclined surface 602*f* opposes the guide piece 910 over a full length of the guide piece 910. For this reason, the inclined surface 602*f* is formed so that the downstream end portion thereof with respect to the mounting direction M contacts the bottom surface 603*a*2 and is aligned with an upstream end portion of the connecting surface with respect to the mounting direction M.

In this embodiment, as described above, the inclined surface 911*a* of the guide piece 910 and the inclined surface 602*f* of the nozzle 602 are formed. For this reason, as shown in part (a) of FIG. 20 described above, even in the case where the mask sheet 800 is inserted from the guide piece 910 side, the mask sheet 800 is guided by the inclined surface 911*a* without being folded as shown in part (b) of FIG. 20.

Further, as shown in part (a) of FIG. 21, even in the case where the mask sheet 800 is inserted from the nozzle 602 side, the mask sheet is guided by the inclined surface 602*f* without being folded as shown in part (b) of FIG. 21.

Next, a constitution of the connecting portion between the guide piece 910 and the pack-side sealing member 603*b* will be described. During movement from the state of part (b) of FIG. 20 to the state of part (c) of FIG. 20, an end of the mask sheet 800 passes through the connecting portion between the guide piece 910 and the pack-side sealing member 603*b*. At this time, in the case where a large stepped portion is formed between the guide piece 910 and the pack-side sealing member 603*b*, there is a liability that the end of the mask sheet 800 is caught by this stepped portion. For this reason, in this embodiment, a corner portion 603*b*12 (see FIG. 19) of a downstream end surface 603*b*11 of the pack-side sealing member 603*b* with respect to the mounting direction M is hooked on the rib 920. By this, the connecting portion 603*b*1 of the pack-side sealing member 603*b* with the guide piece 910 is bent outward with respect to the radial direction. In the following, this constitution will be specifically described.

The pack-side sealing member 603*b* is, as shown in FIG. 16, constituted by an elastic layer 6031, a slide contact layer 6033, and an adhesive portion 6032 adhesively bonding the elastic layer 6031 and the slide contact layer 6033 together. The elastic layer 6031 is constituted by a member high in elastic limit, and by this, predetermined elasticity is imparted to the pack-side sealing member 603*b*. By this elasticity, the pack-side sealing member 603*b* is capable of sliding with the side surface (outer peripheral surface) of the nozzle 602 while being formed, so that an adhesion property between itself and the side surface of the nozzle 602 can be enhanced. Further, the slide contact layer 6033 is formed of a low friction coefficient material, so that the pack-side sealing member 603*b* has a high sliding performance.

Incidentally, in this embodiment, the elastic layer 6031 is formed by a urethane layer of about 3 mm in thickness, the slide contact layer 6033 is formed by a layer of polyester and nylon of about 0.34 mm in thickness, and the adhesive portion 6032 is formed by a double-side tape. Further, as shown in parts (a) and (b) of FIG. 17, in this embodiment, the pack-side sealing member 603*b* is applied onto the inner peripheral surface of the pack-side shutter main body 603*a* in a range of 101°. Incidentally, modulus of longitudinal elasticity of each of the guiding portions 910 and 920 is larger than modulus of longitudinal elasticity of the pack-side sealing member 603*b*.

As shown in parts (a) and (b) of FIG. 18, the downstream end portion (connecting portion) 603*b*1 of the pack-side sealing member 603*b* with respect to the mounting direction M connected with the guide piece 910 is bent toward the outside with respect to the radial direction in the form such that the downstream end portion 603*b*1 enters a side below the guide piece 910. As shown in part (a) of FIG. 19, the downstream end surface 603*b*11 of the pack-side sealing member 603*b* with respect to the mounting direction M has a shape such that the downstream end portion 603*b*11 stands substantially vertically. In this embodiment, as shown in part (b) of FIG. 19, an edge portion 603*b*12 of this end surface 603*b*11 on the inside with respect to the radial direction is pinched with tweezers or the like and then is hooked by the rib 920. Then, the elastic layer 6031 of the pack-side sealing member 603*b* is elastically deformed, whereby the end portion 603*b*1 of the pack-side sealing member 603*b* is bent outward with respect to the radial direction.

Thus, the connecting portion 603*b*1 of the pack-side sealing member 603*b* with the guide piece 910 is bent in the form such that the connecting portion 603*b*1 goes under (outward with respect to the radial direction) the second portion 912 of the guide piece 910. For this reason, in the connecting portion between the guide piece 910 and the pack-side sealing member 603*b*, a stepped portion is prevented from being formed to the extent possible. Accordingly, for example, as shown in part (b) of FIG. 20, even when subsequent to the inclined surface 911*a* of the guide piece 910, the mask sheet 800 guided by the connecting surface 912*a* approaches the connecting portion, the mask sheet 800 is not caught between the connecting surface 912*a* and the pack-side sealing member 603*b*. Then, as shown in part (c) of FIG. 20, the mask sheet 800 is inserted between the side surface of the nozzle 602 and the pack-side sealing member 603*b* smoothly. Further, as shown in parts (b) and (c) of FIG. 21, even in the case where the mask sheet 800 is inserted from the nozzle 602 side, similarly, the mask sheet 800 is inserted between the side surface of the nozzle 602 and the pack-side sealing member 603*b* smoothly.

Incidentally, in the above-described embodiment, the guiding portion 910 and the rib 920 contact the first end portion 603*b*1 of the pack-side sealing member 603*b*, but is not necessarily limited thereto. That is, the guiding portion 910 and the rib 920 do not have to contact the first end portion 603*b*1 of the pack-side sealing member 603*b*.

As described above, in this embodiment, the guide piece 910 constituting the guiding portion 950 fills between the opening 603*a*21 of the pack-side shutter main body 603*a* which is an inserting opening of the mask sheet 800 and the pack-side sealing member 603*b*. This guide piece 910 includes the inclined surface 911*a* inclined so as to be spaced from the nozzle 602 in a second position more remote from the pack-side sealing member 603*b* with respect to the direction of the rotational axis z than a first position. For this reason, even when the mask sheet 800 is inserted from the guide piece 910 side, the mask sheet 800 is guided by the inclined surface 911*a*, so that it is possible to prevent the mask sheet 800 from folding during the insertion of the mask sheet 800. Then, leakage of the toner from the above-described gap G along the fold of the mask sheet 800 can be prevented.

Further, the connecting portion 603*b*1 of the pack-side sealing member 603*b* with the guide piece 910 is bent outward with respect to the radial direction so as to be spaced from the nozzle 602. Further, at least a part of this nozzle 602 overlaps with the above-described guiding portion with respect to the direction of the rotational axis z, and this overlapping portion is positioned on a side opposite from the nozzle 602 with respect to the second portion 912 of the guide piece 910. For this reason, the pack-side sealing member 603*b* can be suppressed from above by the guide piece 910, so that formation of the stepped portion can be prevented in the connecting portion between the guide piece 910 and the pack-side sealing member 603*b*.

Further, in this embodiment, by the rib 920, there is an engaging portion engaging with the end surface 603*b*11 of the pack-side sealing member 603*b* on the guiding portion side (the guide piece 910 side) with respect to the rotational axis direction. For this reason, the pack-side sealing member 603*b* is elastically deformed, so that the edge portion 603*b*12 of the above-described end surface 603*b*11 on the nozzle side is engaged with the rib 620, whereby the connecting portion 603*b*1 can be bent. Incidentally, the connecting portion 603*b*1 may be originally molded in a bent shape, but by utilizing elastic deformation of the pack-side sealing member 603*b* as in this embodiment, the connecting portion 603*b*1 can be inexpensively constituted.

Further, the nozzle 602 includes the inclined surface 602*f* formed so as to oppose the inclined surface 911*a* of the guide piece 910. This inclined surface 602*f* is inclined so as to be spaced from the guide piece 910 in a fourth position more remote from the pack-side sealing member 603*b* with respect to the direction of the rotational axis z than a third position. For this reason, even when the mask sheet 800 is inserted from the nozzle 602 side, the mask sheet 800 is guided by the inclined surface 602*f*, so that it is possible to prevent folding of the mask sheet 800 during the insertion of the mask sheet 800.

Second Embodiment

Next, a second embodiment will be described. This embodiment is different from the first embodiment in that the mask sheet 800 is guided by a guiding sheet 940 instead of the guide piece 910 and the rib 920. For this reason, in the following description, only a difference from the first embodiment will be described, and other descriptions will be omitted.

The guiding sheet 940 is, as shown in FIG. 22, a sheet-like member formed of a resin material such as PPS (polyphenylene sulfide) and is about 60 μm in thickness in this embodiment. This guiding sheet 940 is, as shown in FIG. 23, applied onto the inner peripheral surface of the pack-side shutter main body 603*a* with a double-side tape 943 or the like on one end surface thereof, and forms a fixing portion 941. Further, an end portion of the guiding sheet 940 on the fixing portion 941 side is sandwiched between the inner peripheral surface of the pack-side shutter main body 603*a* and the pack-side sealing member 603*b*.

The above-described fixing portion 941 extends from the end portion thereof sandwiched between the inner peripheral surface of the pack-side shutter main body 603*a* and the pack-side sealing member 603*b* and exceeds a downstream end portion of the pack-side sealing member 603*b*. Specifically, the fixing portion 941 extends to a position where the fixing portion 941 contacts the bottom surface 603*a*2 of the pack-side shutter main body 603*a*.

The downstream end portion of this fixing portion 941 with respect to the mounting direction is a fold-back point of the guiding sheet 940, and the guiding sheet 940 is folded back in the form such that the downstream end portion of the pack-side sealing member 603*b* with respect to the mounting direction is wrapped. Further, an end portion of the guiding sheet 940 on the other side is sandwiched between the pack-side sealing member 603*b* and the nozzle 602. Incidentally, this end portion of the guiding sheet 940 on the other side has a tapered shape as shown in FIG. 22, so that the guiding sheet 940 is easily inserted into between the pack-side sealing member 603*b* and the nozzle 602.

The fold-back portion 942 of the guiding sheet 940 forms a curved surface inclined outward with respect to the radial direction toward the downstream side of the mounting direction M. That is, the fold-back portion 942 as a guiding portion is folded back so as to be curved from the fixing portion 941, and by this curved portion, an inclined surface 942*a* for guiding the mask sheet 800 is formed. In other words, the fold-back portion 942 is a nipping portion which extends from the downstream end portion in the second direction and which nips the first end portion 603*b*1 of the sealing member 603*b* in cooperation with the inner peripheral surface of the pack-side shutter 603*a*.

By this, as shown in part (a) of FIG. 23, even in the case where the mask sheet 800 is inserted from the guiding sheet 940 side, the mask sheet is guided by the inclined surface 942*a* without being folded as shown in part (b) of FIG. 23.

Third Embodiment

Next, a third embodiment will be described. This embodiment is different from the first embodiment in a shape of the rib 920 and a method in which the sealing member is caused to set into the guide piece and is curved. For this reason, in the following description, only a difference from the first embodiment will be described, and other descriptions will be omitted.

A rectangular rib 3920 in this embodiment, similar to the first embodiment, as shown in FIG. 24, is formed along the side surface (inner peripheral surface) 603*a*1 from the bottom surface 603*a*2 of the pack-side shutter main body 603*a* in the direction of the rotational axis z in the neighborhood of an edge portion of the opening 603*a*11 of the pack-side shutter main body 603*a* on one end side. This rib 3920 is shorter than the rib 920 in the first embodiment with respect to the direction of the rotational axis z. For this reason, an upstream end portion of the rib 3920 with respect to the first direction (mounting direction M) is positioned downstream of the first end portion 603*b*1 of the sealing member 603*b* with respect to the first direction, and does not contact the first end portion 603*b*1 of the sealing member 603*b*. Similar to the first embodiment, on the rib 3920, the recessed mounting portion 914 of the guide piece 910 is mounted while being slid in the direction of the rotational axis z, and by this, the guide piece 910 is mounted on the pack-side shutter main body 603*a*.

Next, a constitution of the connecting portion between the guide piece 910 and the pack-side sealing member 603*b* will be described. During movement from the state of part (b) of FIG. 26 to the state of part (c) of FIG. 26, an end of the mask sheet 800 passes through the connecting portion between the guide piece 910 and the pack-side sealing member 603*b*. At this time, in the case where a large stepped portion is formed between the guide piece 910 and the pack-side sealing member 603*b*, there is a liability that the end of the mask sheet 800 is caught by this stepped portion. For this reason, in this embodiment, as shown in FIG. 25, a downstream end surface 603*b*11 of the pack-side sealing member 603*b* with respect to the mounting direction M is caused to get into the guide piece 910. Further, a bottom surface 603*b*13 of the pack-side sealing member 603*b* caused to get into the guide piece 910 is fixed to a double-side tape 3701 applied to the side surface (inner peripheral surface) of the pack-side shutter main body 603*a*. By this, an elastic layer 6031 of the pack-side sealing member 603*b* is elastically deformed, and the connecting portion 603*b*1 of the pack-side sealing member 603*b* with the guide piece 910 is bent outward with respect to the radial direction.

Thus, the connecting portion 603*b*1 of the pack-side sealing member 603*b* with the guide piece 910 is bent in the form such that the connecting portion 603*b*1 goes under (outward with respect to the radial direction) the second portion 912 of the guide piece 910. For this reason, in the connecting portion between the guide piece 910 and the pack-side sealing member 603*b*, a stepped portion is prevented from being formed to the extent possible. Accordingly, for example, as shown in part (b) of FIG. 26, even when, subsequent to the inclined surface 911*a* of the guide piece 910, the mask sheet 800 guided by the connecting surface 912*a* approaches the connecting portion, the mask sheet 800 is not caught between the connecting surface 912*a* and the pack-side sealing member 603*b*. Then, as shown in part (c) of FIG. 26, the mask sheet 800 is inserted into between the side surface of the nozzle 602 and the pack-side sealing member 603*b* smoothly. Further, as shown in parts (b) and (c) of FIG. 27, even in the case where the mask sheet 800 is inserted from the nozzle 602 side, the mask sheet 800 is inserted between the side surface of the nozzle 602 and the pack-side sealing member 603*b* smoothly.

As described above, in this embodiment, the guide piece 910 fills between the opening 603*a*21 of the pack-side shutter main body 603*a*, which is an inserting opening of the mask sheet 800, and the pack-side sealing member 603*b*. Also, in this embodiment, similar to the first embodiment, even when the mask sheet 800 is inserted from the guide piece 910 side, the mask sheet 800 is guided by the inclined surface 911*a*, so that it is possible to prevent the mask sheet 800 from folding during the insertion of the mask sheet 800. Then, leakage of the toner from the above-described gap G along the fold of the mask sheet 800 can be prevented.

Further, the connecting portion 603*b*1 of the pack-side sealing member 603*b* with the guide piece 910 is bent outward with respect to the radial direction so as to be spaced from the nozzle 602. Further, at least a part of this nozzle 602 overlaps with the above-described guiding portion with respect to the direction of the rotational axis z, and this overlapping portion is positioned on a side opposite from the nozzle 602 with respect to the second portion 912 of the guide piece 910. For this reason, the pack-side sealing member 603*b* can be suppressed from above by the guide piece 910, so that formation of the stepped portion can be prevented in the connecting portion between the guide piece 910 and the pack-side sealing member 603*b*.

Further, in this embodiment, the connecting portion 603*b*1 of the pack-side sealing member 603*b* is caused to get into the guide piece 910, and the bottom surface 603*b*13 of the connecting portion 603*b*1 is fixed with the double-side tape 3701, so that the connecting portion 603*b*1 can be bent. The connecting portion 603*b*1 may be originally molded in a bent shape, but by utilizing elastic deformation of the pack-side sealing member 603*b* as in this embodiment, the connecting portion 603*b*1 can be inexpensively constituted.

Incidentally, the constitutions described in the above-described embodiments may be employed in any combination.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-198917 filed on Dec. 7, 2021, which is hereby incorporated by reference herein in its entirety.

What is claimed is:

1. A toner container comprising:

a toner accommodating portion configured to accommodate toner;

a discharge portion provided with a discharge opening through which the toner accommodated in the toner accommodating portion may be discharged;

a shutter rotatable about a rotational axis between an open position where the discharge opening is open and a closed position where the discharge opening is closed, the discharge opening being disposed in an outer peripheral surface of the discharge portion extending in a direction of the rotational axis;

a sealing member provided on an inner peripheral surface of the shutter facing inward in a radial direction of a virtual circle centered on the rotational axis, wherein the seal member is configured to seal between the inner peripheral surface of the shutter and the outer peripheral surface of the discharge portion when the shutter is in the closed position, the sealing member including a contact surface contacting the outer peripheral surface of the discharge portion; and a guiding portion including a downstream end portion in a first direction that is a direction from the toner accommodating portion toward the discharge portion in the direction of the rotational axis, wherein an end portion of the sealing member on a downstream side in the first direction is a first end portion, wherein the downstream end portion of the guiding portion is positioned downstream of the first end portion of the sealing member with respect to the first direction, wherein the downstream end portion of the guiding portion overlaps with the first end portion of the sealing member as viewed in the direction of the rotational axis, and wherein the downstream end portion of the guiding portion includes a guiding surface which faces downstream in the first direction and which extends so as to approach the contact surface of the seal member from a downstream side toward an upstream side in the first direction.

2. The toner container according to claim 1, wherein the guiding portion contacts the first end portion of the sealing member.

3. The toner container according to claim 1, wherein the guiding portion has a greater modulus of longitudinal elasticity than the sealing member.

4. The toner container according to claim 1, wherein the guiding surface of the downstream end portion of the guiding portion extends toward a downstream side in the first direction and extends in a circumferential direction of the virtual circle from the closed position toward the open position of the shutter.

5. The toner container according to claim 1, wherein the guiding portion includes a guide piece separated from the shutter and attached to the shutter, wherein the first end portion of the sealing member overlaps with an upstream end portion of the guiding piece in the first direction when viewed in a direction orthogonal to the rotational axis, and wherein the first end portion of the sealing member is positioned outside the upstream end portion of the guiding piece with respect to the radial direction.

6. The toner container according to claim 1, wherein the first end portion of the sealing member is curved toward outside of the toner container with respect to the radial direction.

7. The toner container according to claim 1, wherein the guiding portion includes an engaging portion engaging with a downstream end surface of the first end portion of the sealing member in the first direction, and wherein an inside edge of the downstream end surface of the first end portion of the sealing member with respect to the radial direction engages with the engaging portion of the guiding portion so that the first end portion of the sealing member is elastically deformed to be curved toward outside of the toner container with respect to the radial direction.

8. The toner container according to claim 7, wherein the guiding portion includes a guide piece which is provided separately from the shutter and on which the guiding surface is formed, and wherein the engaging portion is a rib formed integrally with the shutter, and the guide piece is mounted on the rib.

9. The toner container according to claim 1, wherein the guiding portion includes a nipping portion which extends in the second direction and which nips the first end portion of the sealing member in cooperation with the inner peripheral surface of the shutter in the radial direction.

10. The toner container according to claim 1, wherein the first end portion of the sealing member is bonded to the inner peripheral surface of the shutter.

11. The toner container according to claim 10, wherein the guiding portion includes:

a guide piece which is provided separately from the shutter and on which the guiding surface is formed, and a rib which is formed integrally with the shutter and on which the guide piece is mounted, and wherein the rib is not in contact with the first end portion of the sealing member at an upstream end portion thereof with respect to the first direction.

12. The toner container according to claim 1, wherein the discharge portion includes an inclined surface formed inside the discharge portion with respect to the radial direction so as to oppose the guiding surface of the guiding portion, and the inclined surface of the discharge portion is inclined so as to approach the rotational axis toward a downstream side in the first direction.

13. An image forming system comprising:

a toner container according to claim 1;

an image forming apparatus including a mounting portion on which the toner container is mounted, the mounting portion including:

a mounting guide configured to guide the discharge portion in a mounting direction of the toner container in engagement with a part of the discharge portion; and a mask sheet mounted on the mounting guide; and an apparatus side shutter provided with a communication opening communicating with a toner receiving opening through which the toner from the toner container is supplied to the image forming apparatus, wherein the apparatus side shutter is rotatable between an open position where the communication opening opposes the toner receiving opening with respect to the radial direction and a shielding position where the communication opening is positioned outside the mounting guide with respect to the radial direction and shields the toner receiving opening, wherein a boundary portion between the mounting guide and the discharge portion is positioned in a position opposing the communication opening with respect to the radial direction during rotation of the apparatus side shutter from the open position to the shielding position, and wherein, in a case that the toner container in which the apparatus side shutter is in the closed position is mounted on the mounting portion, the mask sheet extends over the boundary portion between the mounting guide and the discharge portion with respect to a rotational direction of the apparatus side shutter and is inserted in between the outer peripheral surface of the discharge portion and the sealing member.

14. The toner container according to claim 1, wherein the toner container is mounted on a mounting portion of an image forming apparatus, with the mounting portion including a sheet, and wherein the guiding surface of the guiding portion is configured to guide the sheet to be inserted in between the outer peripheral surface of the discharge portion and the sealing member during a mounting of the toner container to the mounting portion.

15. The toner container according to claim 1, wherein the discharge portion is a nozzle, and wherein the toner accommodating portion is a pouch.

* * * * *